United States Patent [19]

Sprecker

[11] Patent Number: 4,517,213
[45] Date of Patent: May 14, 1985

[54] FLAVORING WITH NORBORNYL ESTERS

[75] Inventor: Mark A. Sprecker, Sea Bright, N.J.

[73] Assignee: International Flavors & Fragrances Inc., New York, N.Y.

[21] Appl. No.: 643,680

[22] Filed: Aug. 24, 1984

Related U.S. Application Data

[62] Division of Ser. No. 574,183, Jan. 26, 1984, , which is a division of Ser. No. 507,290, Jun. 23, 1983, Pat. No. 4,480,648, which is a division of Ser. No. 396,288, Jul. 8, 1982, Pat. No. 4,435,316.

[51] Int. Cl.³ ............................................. A23L 1/226
[52] U.S. Cl. ...................................................... 426/538
[58] Field of Search ...................... 426/538, 3; 424/49, 424/365

[56] References Cited

U.S. PATENT DOCUMENTS 4,435,316  3/1984  Sprecker ............................. 560/220

Primary Examiner—Joseph Golian
Attorney, Agent, or Firm—Arthur L. Liberman

[57] ABSTRACT

Described is a genus of compounds defined according to the structure:

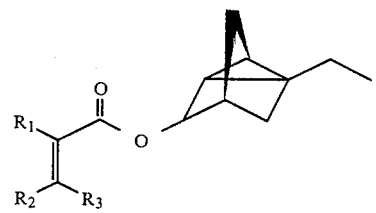

hereinafter termed "norbornyl esters" wherein $R_1$, $R_2$ and $R_3$ represent methyl or hydrogen with the proviso that at least one of $R_1$, $R_2$ and $R_3$ is hydrogen as well as uses thereof in augmenting or enhancing the aroma or taste of consumable materials including foodstuffs, chewing gums, medicinal products, toothpastes, chewing tobaccos, smoking tobaccos, smoking tobacco articles, perfume compositions, colognes and perfumed articles (including, but not limited to, solid or liquid anionic, cationic, nonionic or zwitterionic detergents, fabric softener compositions, fabric softener articles, hair preparations and perfumed polymers). Also described is a novel process for preparing such norbornyl esters.

8 Claims, 12 Drawing Figures

GLC PROFILE FOR EXAMPLE II.
CRUDE

GLC PROFILE FOR EXAMPLE I

IR SPECTRUM FOR FRACTION 5 OF EXAMPLE I

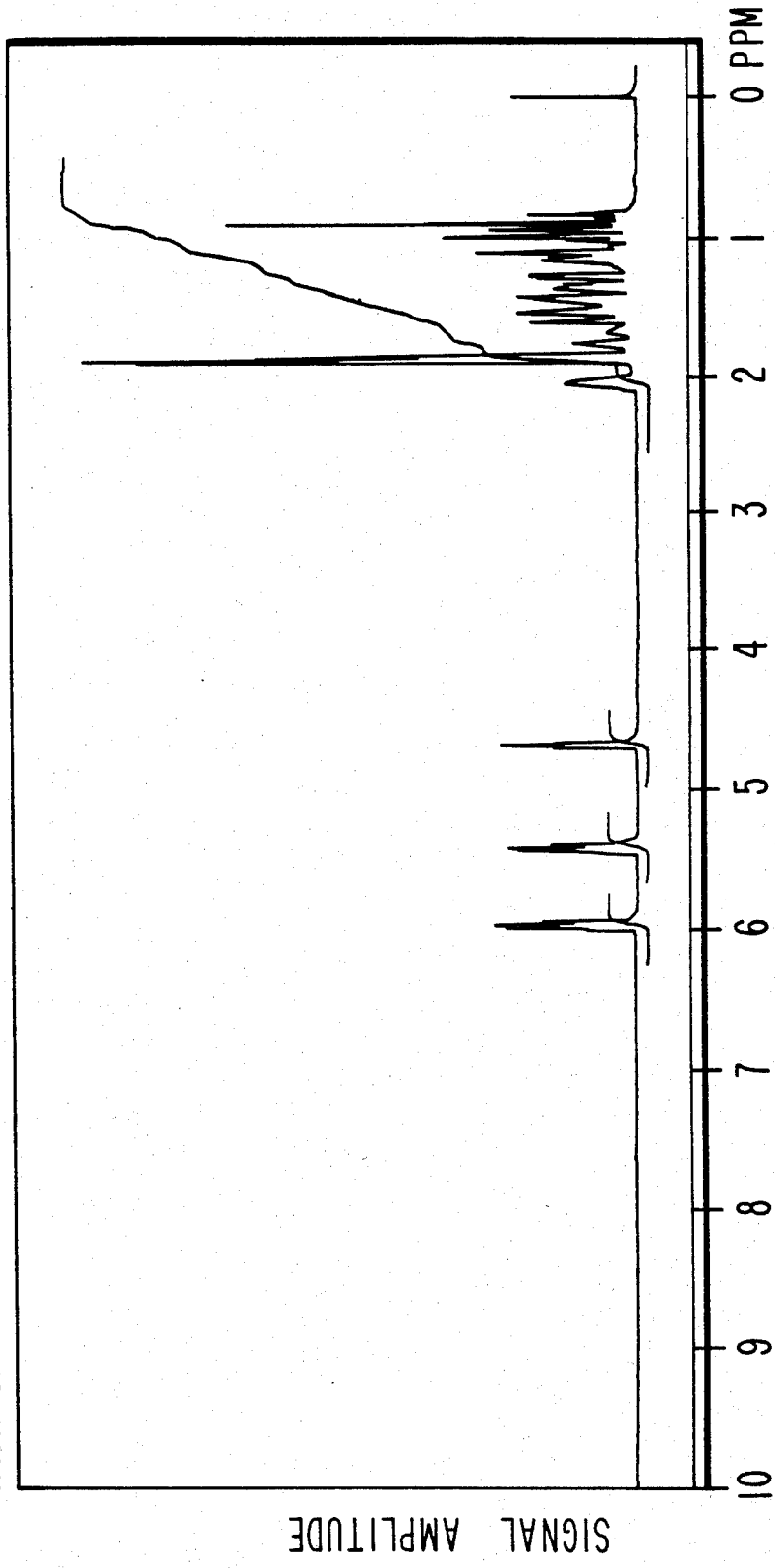

IR SPECTRUM FOR FRACTION 3 OF EXAMPLE II

GLC PROFILE FOR EXAMPLE IV. CRUDE

GLC PROFILE FOR EXAMPLE III.

NMR SPECTRUM FOR FRACTION 10 OF EXAMPLE III.

IR SPECTRUM FOR FRACTION 10 OF EXAMPLE III

NMR SPECTRUM FOR FRACTION 9 OF EXAMPLE IV

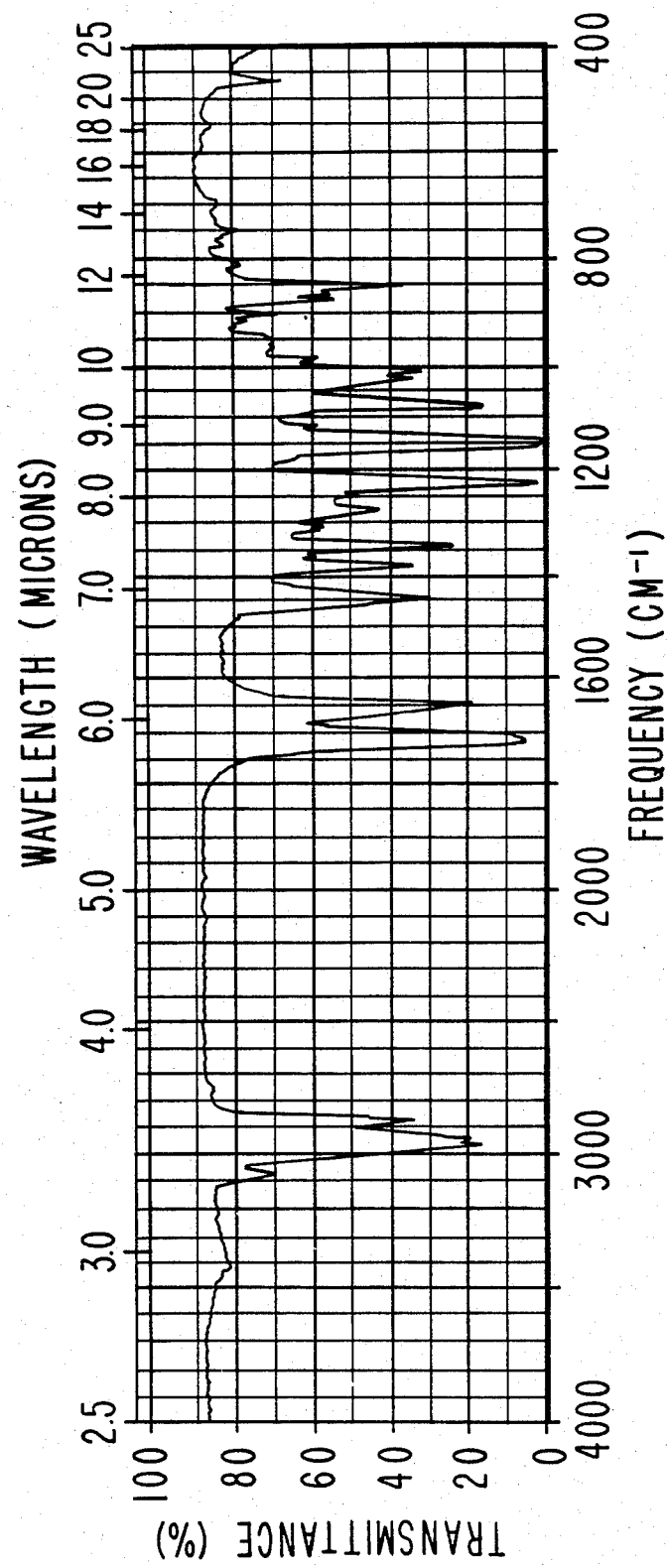

FLAVORING WITH NORBORNYL ESTERS

This is a divisional of application Ser. No. 574,183, filed Jan. 26, 1984 which, in turn, is a stream-line divisional application of Ser. No. 507,290 filed on June 23, 1983, U.S. Pat. No. 4,480,648, which, in turn, is a stream-line divisional application of Ser. No. 396,288 filed July 8, 1982 now U.S. Pat. No. 4,435,316 issued on Mar. 6, 1984.

BACKGROUND OF THE INVENTION

The present invention relates to substituted norbornyl ester derivatives of the genus of compounds having the structure:

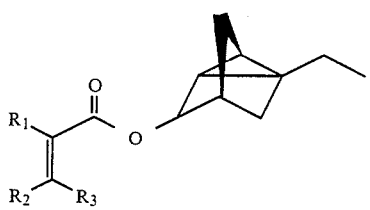

wherein $R_1$, $R_2$ and $R_3$ represents methyl or hydrogen with at least one of $R_1$, $R_2$ and $R_3$ being hydrogen and uses thereof in order to alter, modify or enhance the aroma or taste of consumable materials.

There has been considerable work performed relating to substances which can be used to impart (modify, augment or enhance) fragrances and tastes to (or in) various consumable materials. The substances are used to diminish the use of natural materials some of which may be in short supply and to provide more uniform properties in the finished product.

Sweet, amber-like, powerful long-lasting green, herbaceous, floral, fruity, powerful anisic and bergamot-like aroma nuances are desirable in several types of perfume compositions, perfumed articles and colognes.

Sweet, licorice-like, anise oil-like, spicy, fresh dandelion leaf and raw spinach aroma and taste nuances with faint scallion-like nuances are desirable in augmenting or enhancing the aroma and/or taste of foodstuffs, chewing gums, medicinal products, chewing tobaccos and toothpastes.

Turkish-like tobacco nuances are particularly desirable in augmenting or enhancing the aroma or taste of smoking tobacco and smoking tobacco article components both prior to smoking and on smoking in the main stream and the side stream.

The perfume use of norbornene alcohol and ester derivatives having the structures:

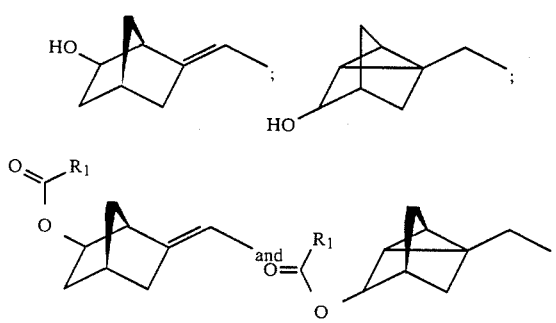

wherein $R_1$ is $C_1$-$C_4$ alkyl is disclosed in U.S. Pat. No. 3,860,635 particularly at Example XV at column 16 thereof. Such compounds and the syntheses thereof are also disclosed by Bobyleva, Zh. Org. Kh. Volume 13, No. 10, pages 2085-92, October 1977. In addition, ethers of norbornene derivatives having the structures:

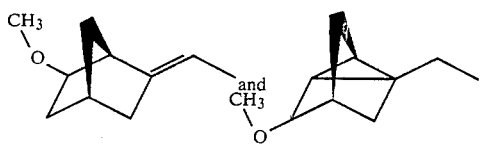

are disclosed as well as the process for preparing same according to the reaction:

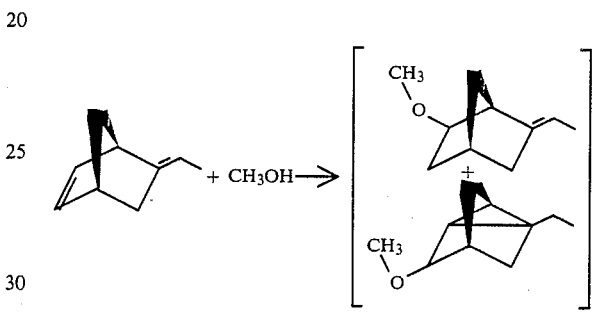

in Shield, Can. J. Chem. Volume 49, 1971, page 1142.

U.S. Pat. No. 3,927,116 indicates the utility of certain vinyl norbornyl ethers having the structure:

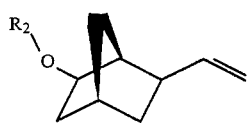

wherein $R_2$ represents $C_1$-$C_4$ alkyl as being intermediate for the preparation of detergents at column 9 lines 10-15. No indication in U.S. Pat. No. 3,927,116 of the use of such compounds in perfumery, for augmenting or enhancing the aroma of perfumes, perfumed articles and colognes, is suggested either implicitly or explicitly in U.S. Pat. No. 3,927,116.

However, the compounds of our invention defined according to the structure:

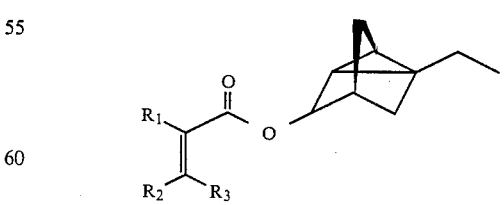

wherein $R_1$, $R_2$ and $R_3$ represent methyl or hydrogen and at least one of $R_1$, $R_2$ and $R_3$ is hydrogen have unexpected, unobvious and advantageous organoleptic properties in consumable materials over any closely similar compounds of the prior art.

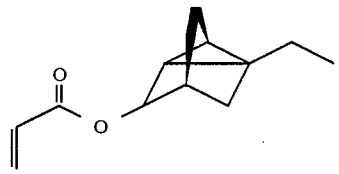

(conditions: 10'×⅛" SE-30 column programmed at 150°–220° C. at 6° C. per minute).

Figure 2:
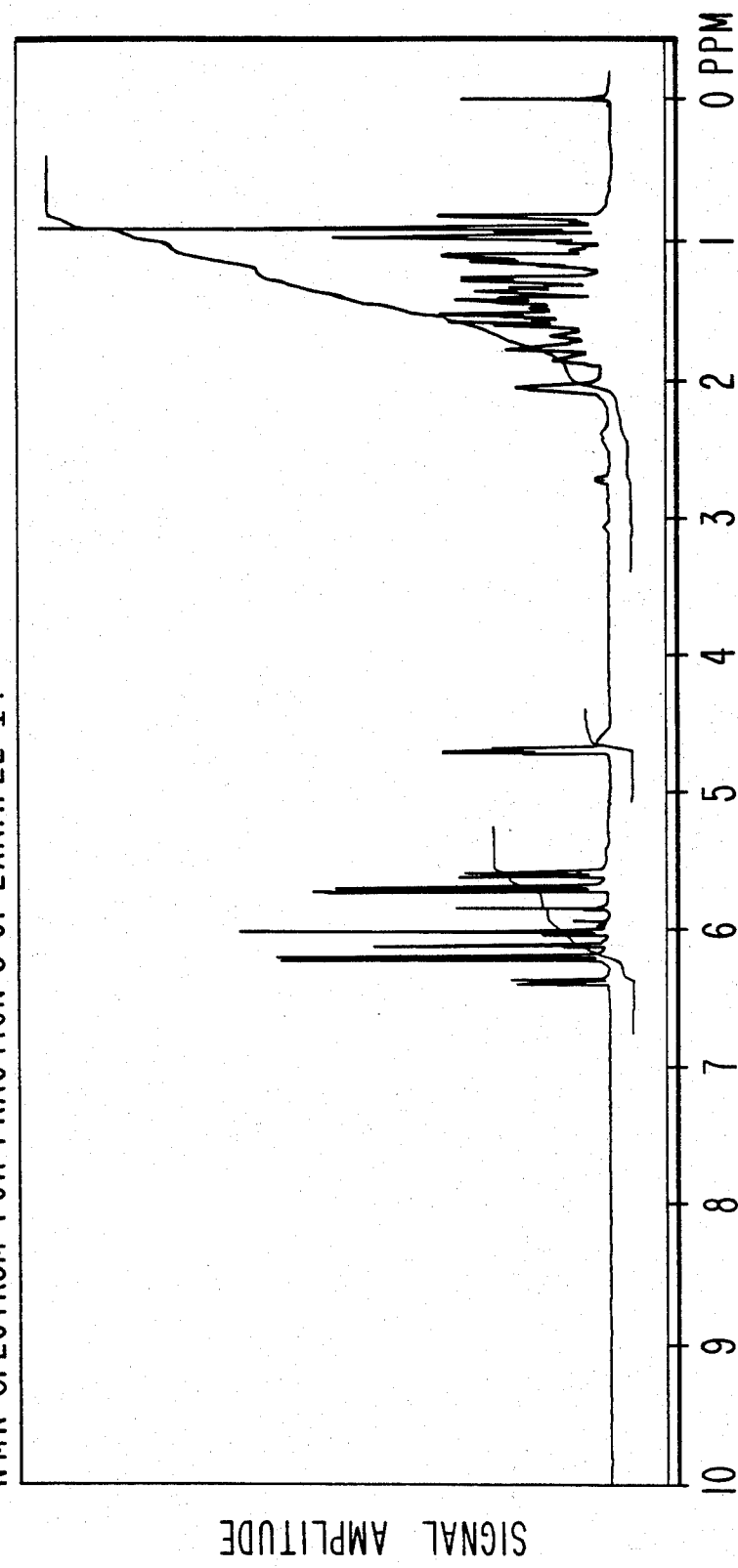

FIG. 2 is the NMR spectrum for Fraction 5 of the distillation product of the reaction product of Example I containing the compound having the structure:

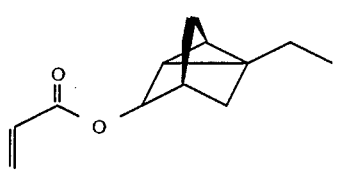

(Solvent: $CFCl_3$; Field strength: 100 MHz).

Figure 3:
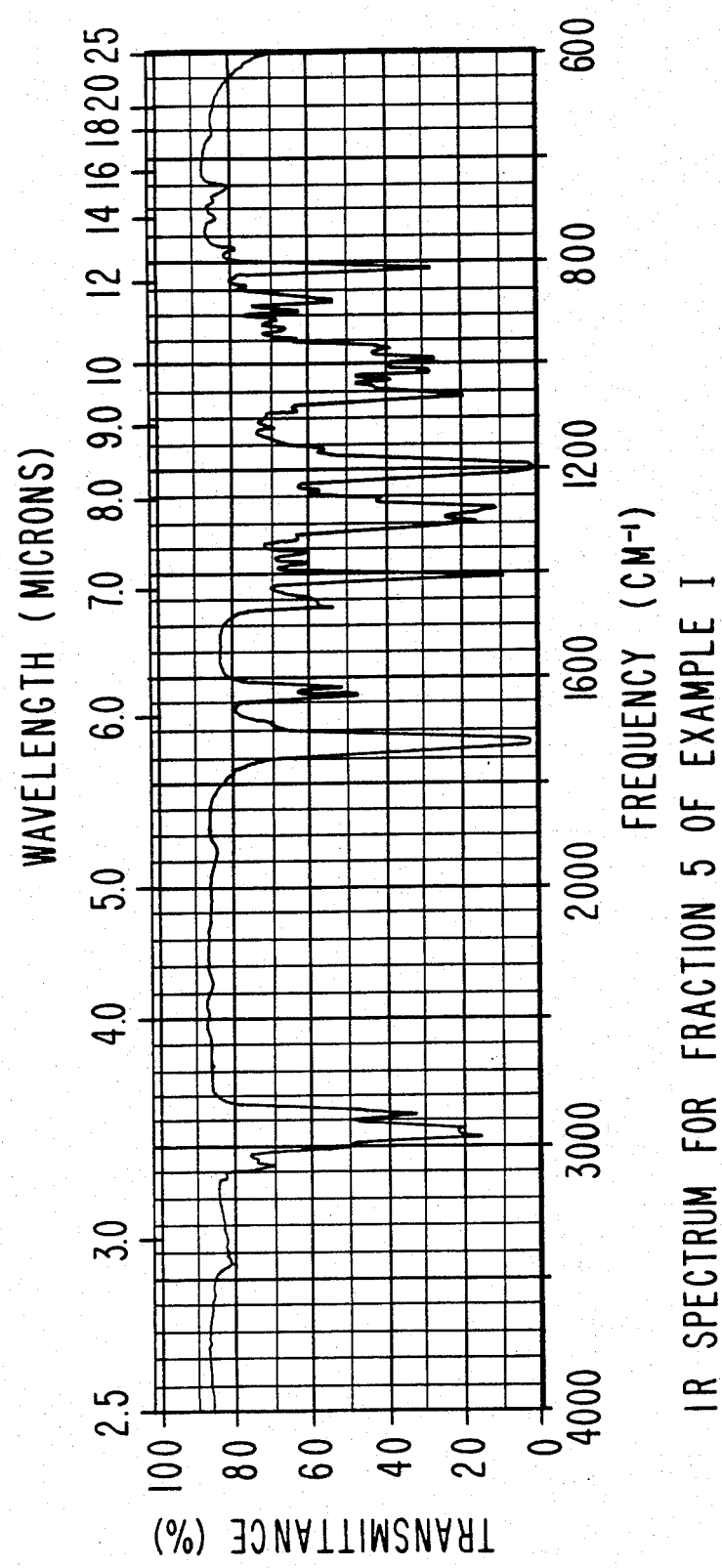

FIG. 3 is the infra-red spectrum for Fraction 5 of the distillation product of the reaction product of Example I containing the compound having the structure:

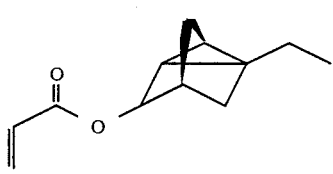

Figure 4:
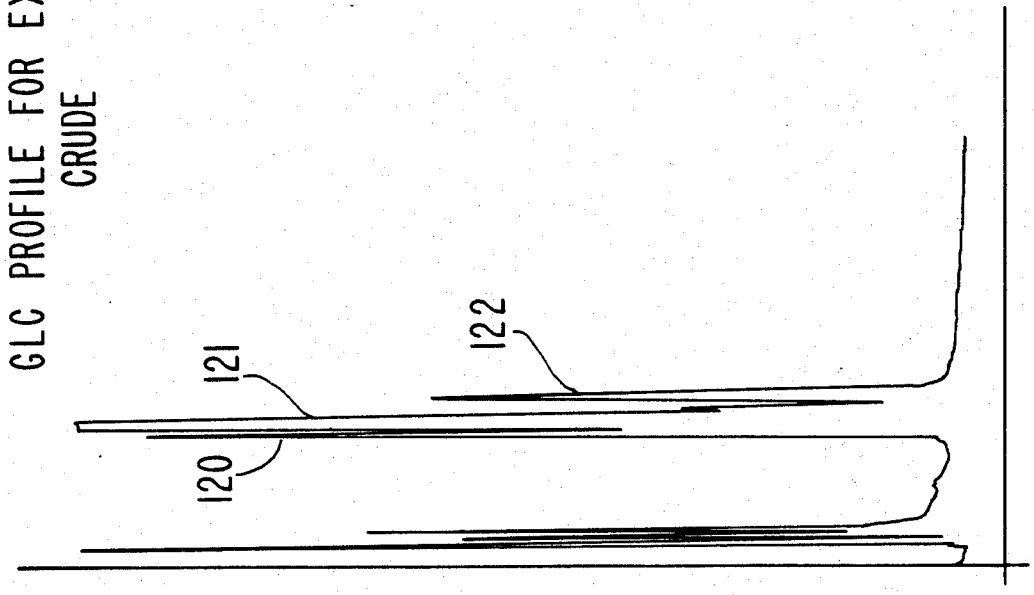

FIG. 4 is the GLC profile for the crude reaction product of Example II containing the compound having the structure:

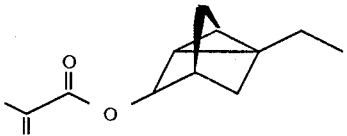

FIG. 5 is the NMR spectrum for Fraction 3 of the distillation product of the reaction product of Example II containing the compound having the structure:

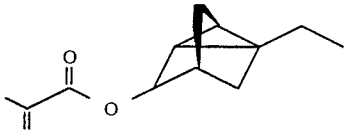

(Solvent: $CFCl_3$; Field strength: 100 MHz).

Figure 6:
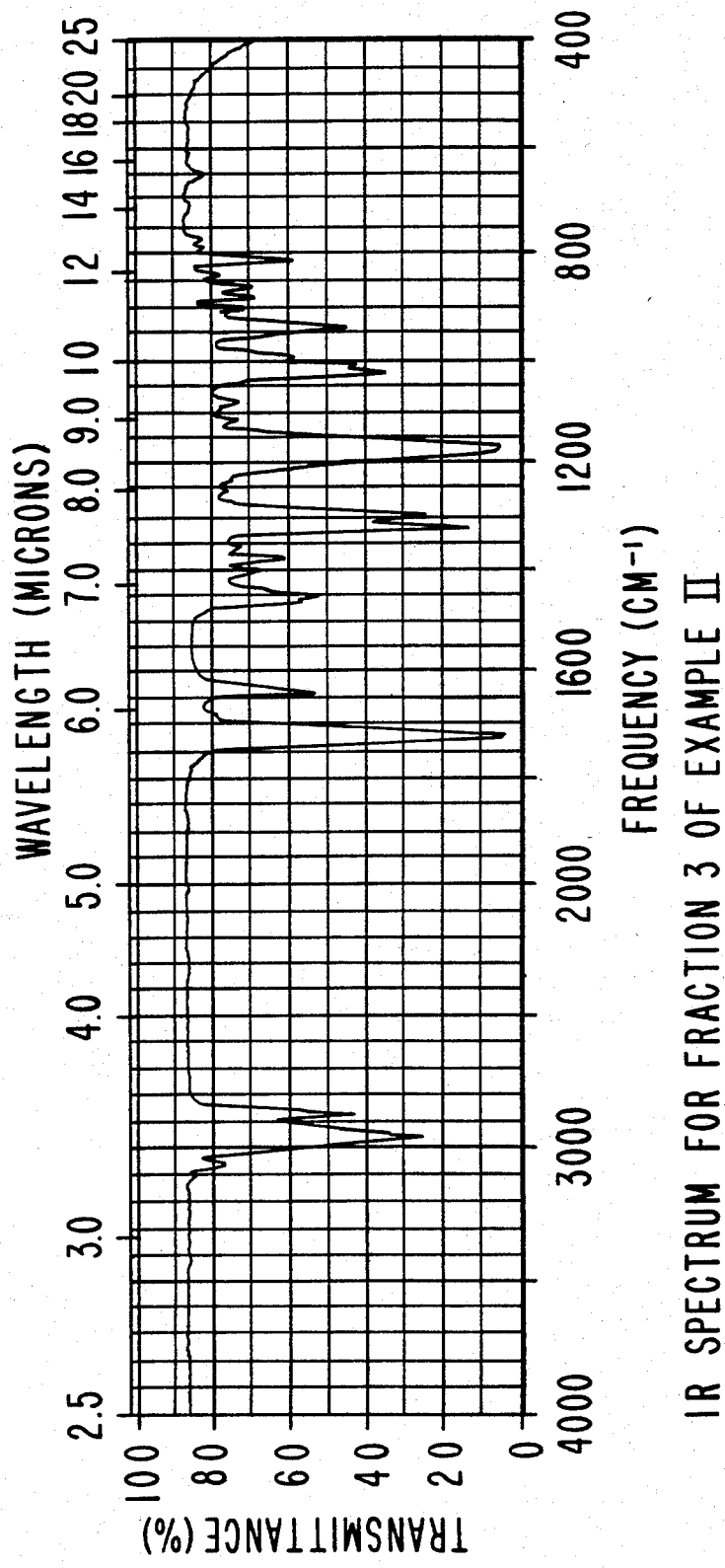

FIG. 6 is the infra-red spectrum for Fraction 3 of the distillation product of the reaction product of Example II containing the compound having the structure:

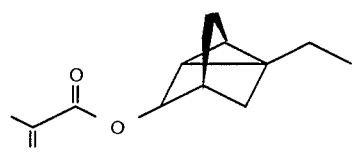

Figure 7:
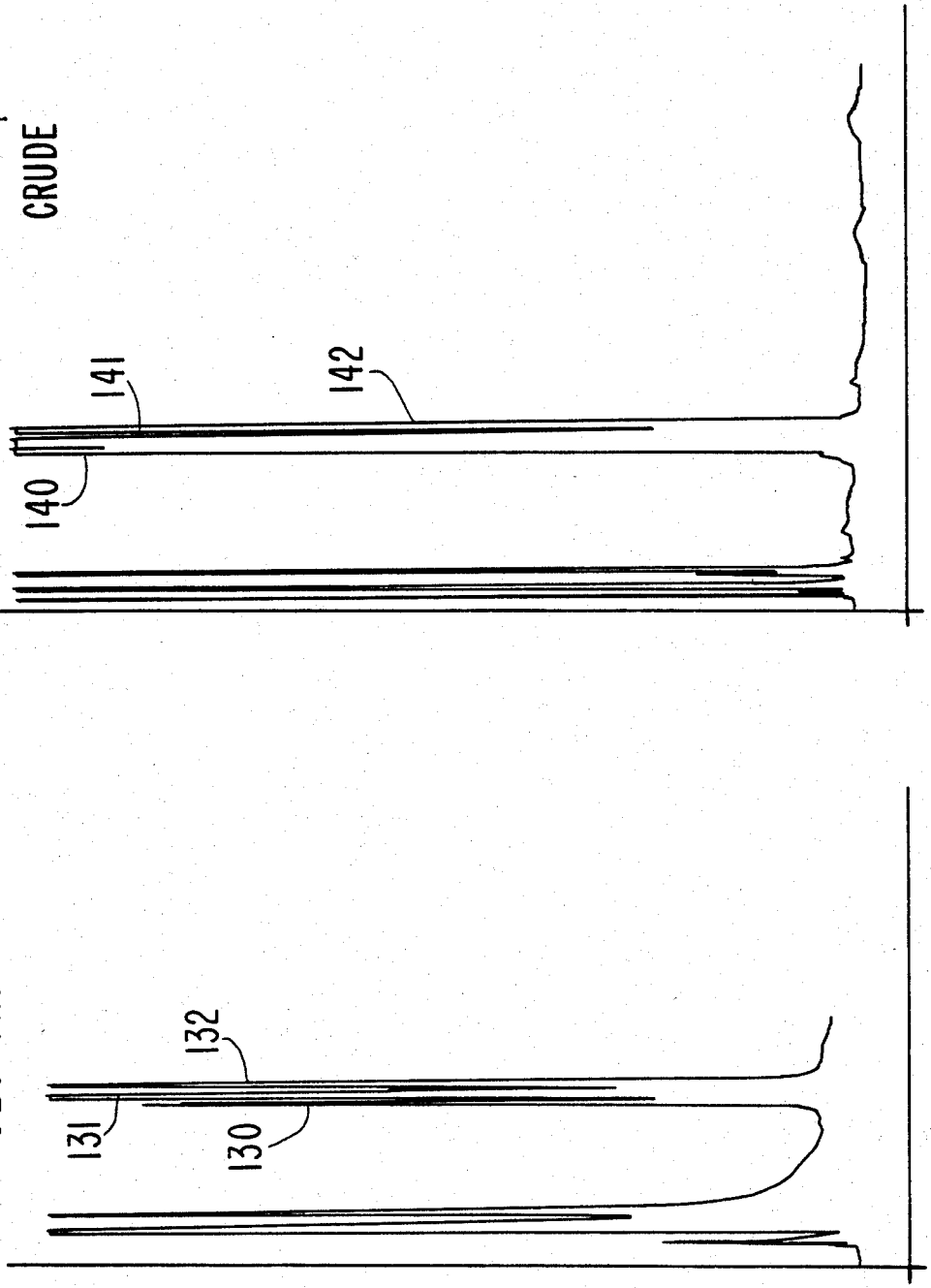

FIG. 7 is the GLC profile for the crude reaction product of Example III containing the compound having the structure:

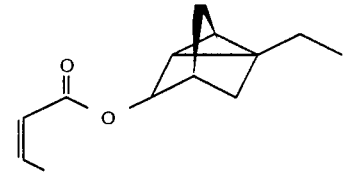

(cis and trans isomer mixture).

Figure 8:
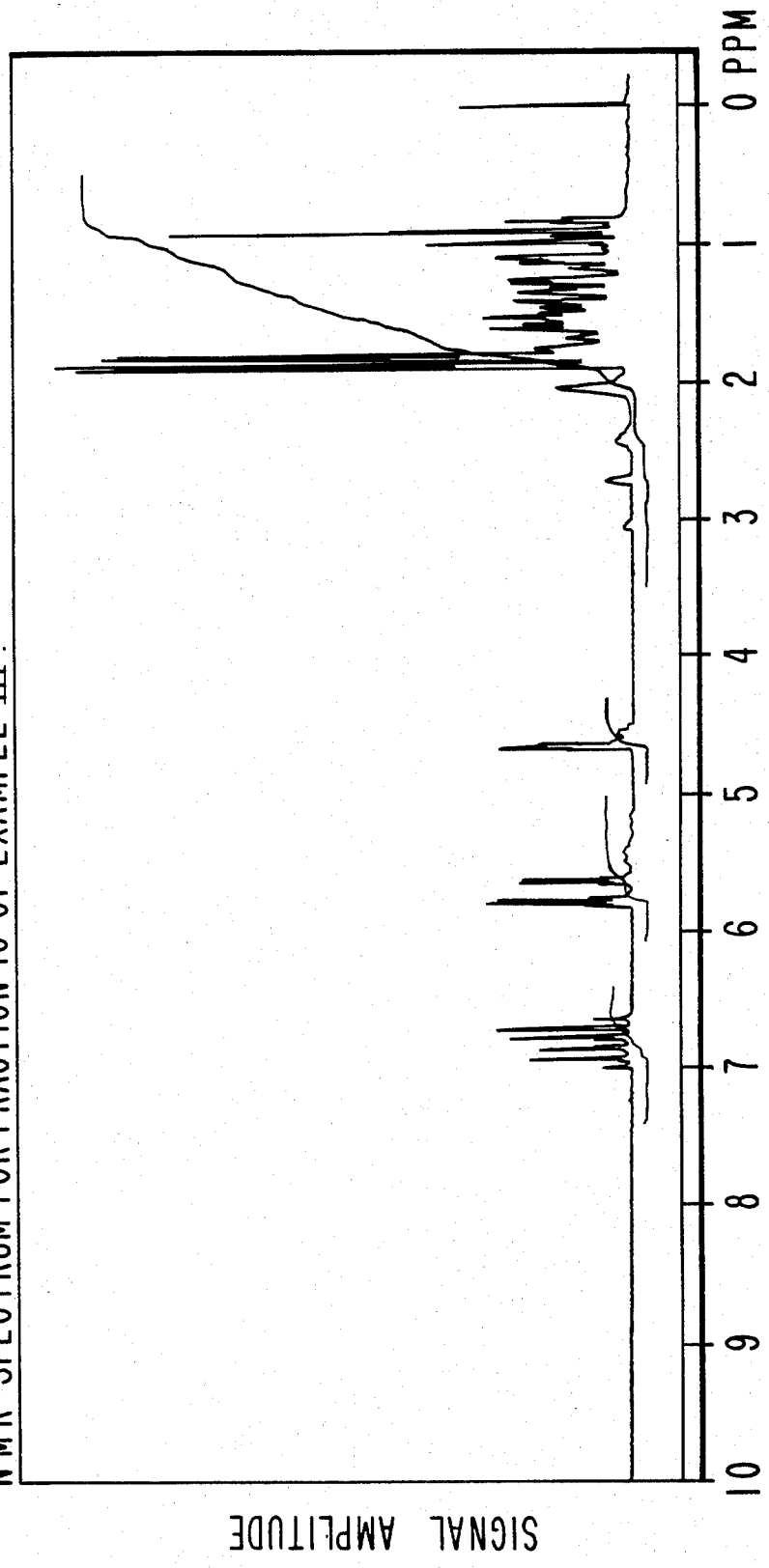

FIG. 8 is the NMR spectrum for Fraction 10 of the distillation product of the reaction product of Example III containing the compound having the structure:

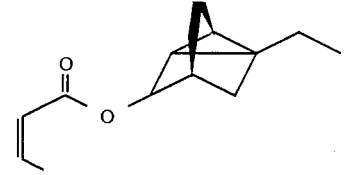

(Solvent: $CFCl_3$; Field strength: 100 MHz).

Figure 9:
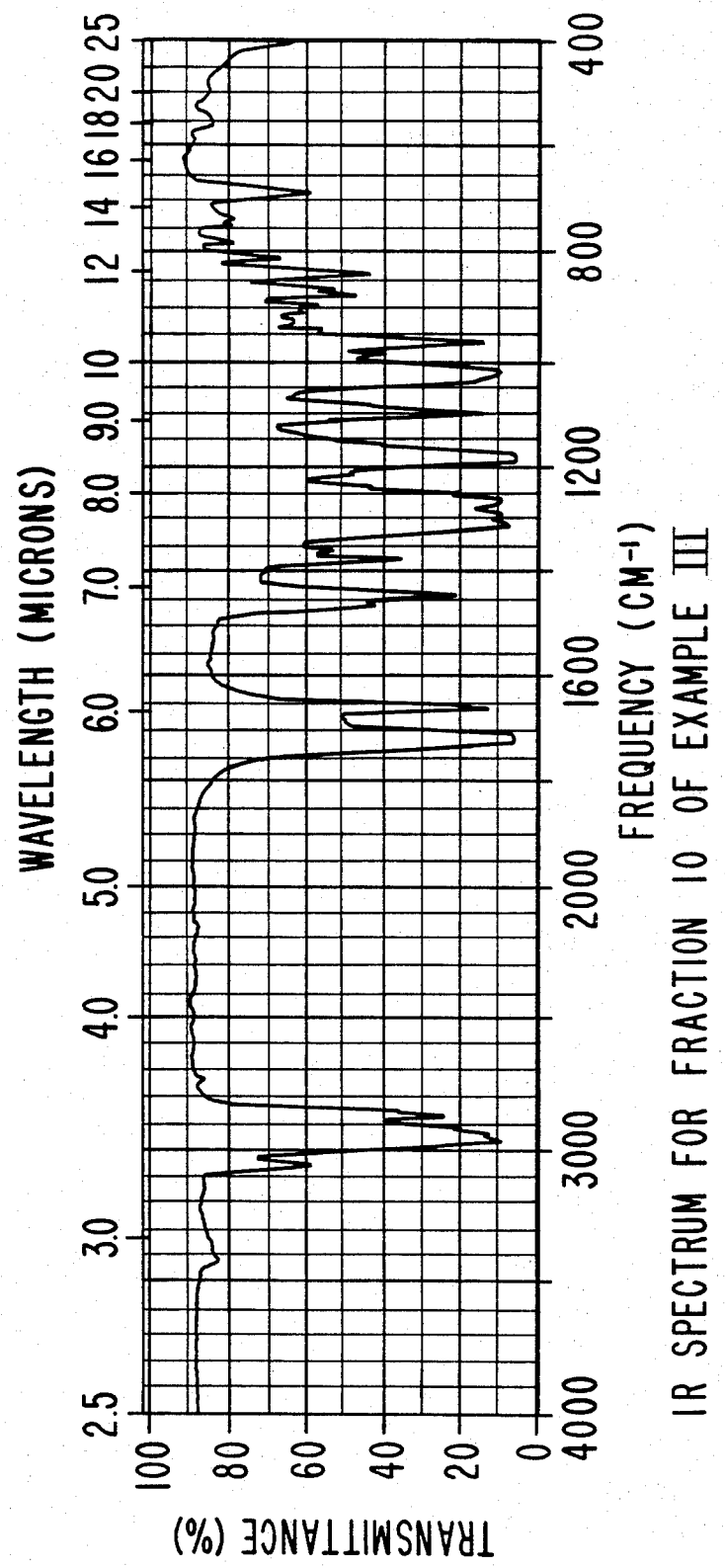

FIG. 9 is the infra-red spectrum for Fraction 10 of the distillation product of the reaction product of Example III containing the compound having the structure:

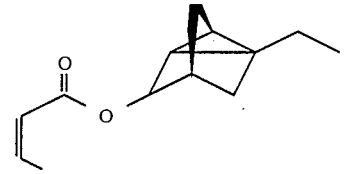

Figure 10:
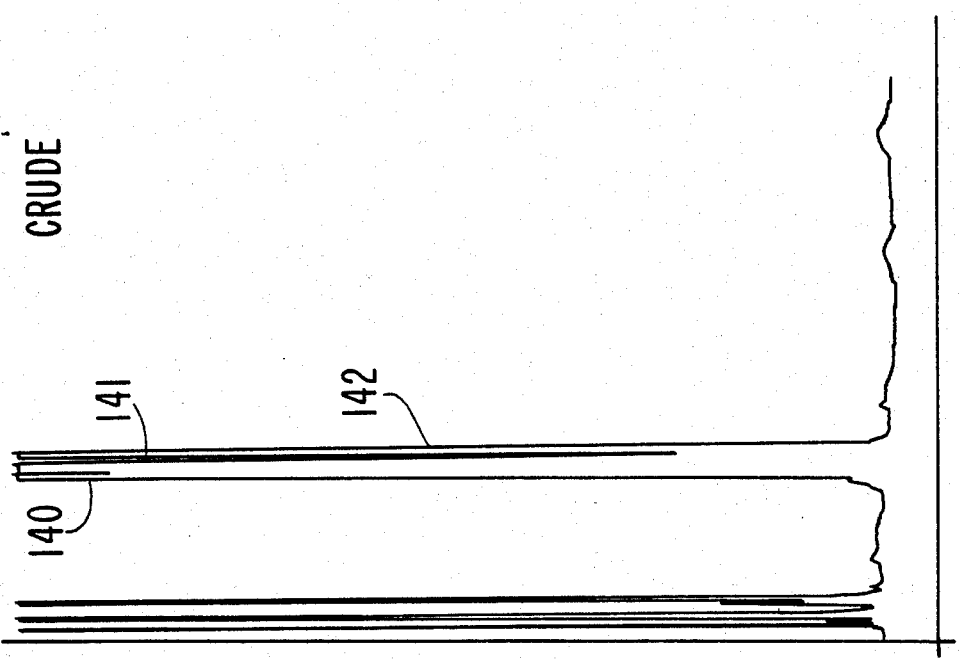

FIG. 10 is the GLC profile of the crude reaction product of Example IV containing the compound having the structure:

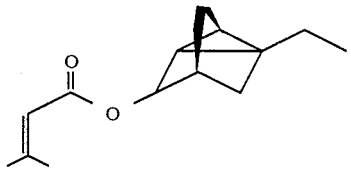

Figure 11:
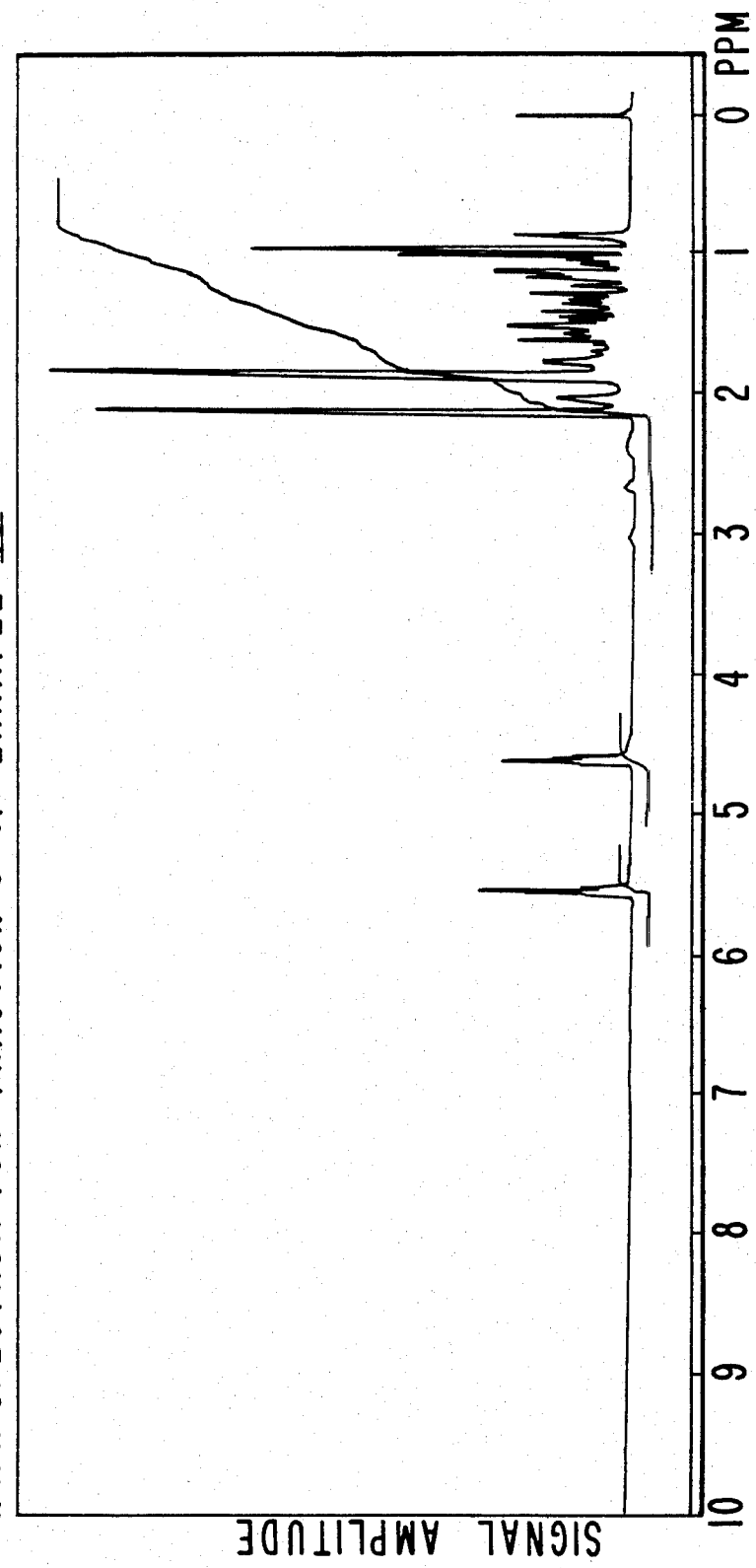

FIG. 11 is the NMR spectrum for Fraction 9 of the distillation product of the reaction product of Example IV containing the compound having the structure:

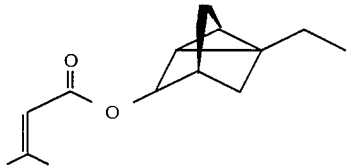

(Solvent: CFCl₃; Field strength: 100 MHz).

FIG. 12 is the infra-red spectrum for Fraction 9 of the distillation product of the reaction product of Example IV containing the compound having the structure:

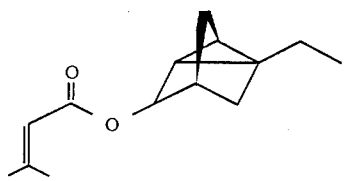

DETAILED DESCRIPTION OF THE DRAWINGS

Figure 1:
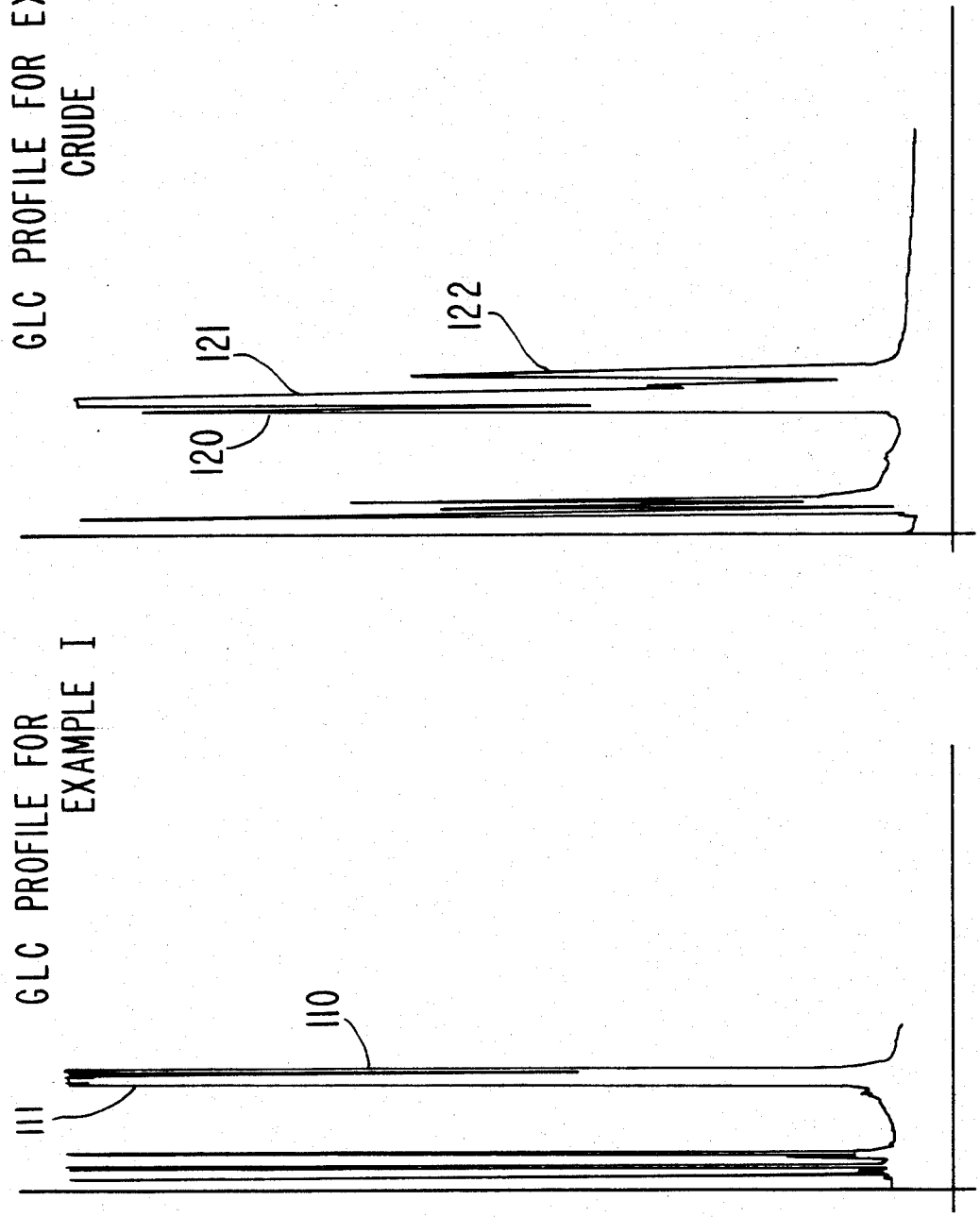
FIG. 1 is the GLC profile for the crude reaction product of Example I containing the compound having the structure.

In FIG. 1 which is the GLC profile for the reaction product of Example I containing the compound having the structure:

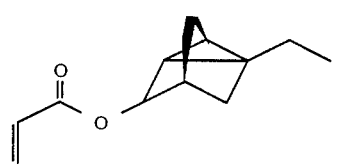

the peaks indicated by reference numerals "110" and "111" are the peaks for the reaction product including the major reaction product (greater than 80%) which is the compound having the structure:

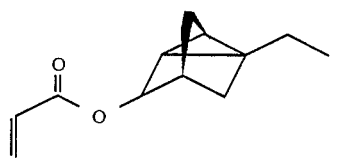

but also including other compounds, for example, the compound having the structure:

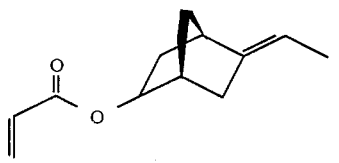

FIG. 4 is the GLC profile of the crude reaction product of Example II which is indicated by peaks "120", "121" and "122". The major peak "121" is the peak for the compound defined according to the structure:

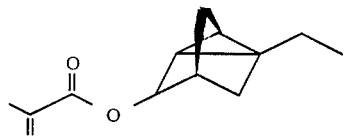

The additional peaks "120" and "122" are for isomeric compounds including that having the structure:

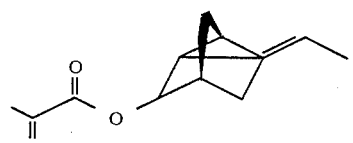

FIG. 7 is the GLC profile for the reaction product of Example III containing a major proportion of the compounds having the structures:

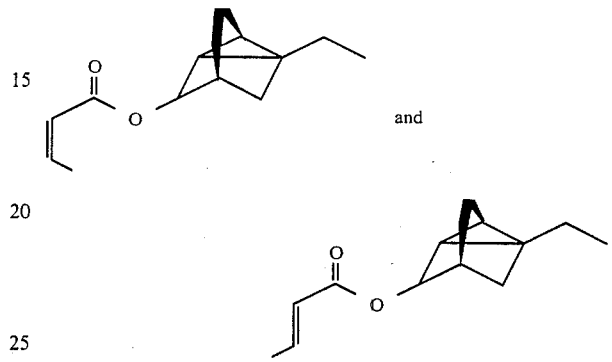

The major peak "131" is for the compounds having the structures:

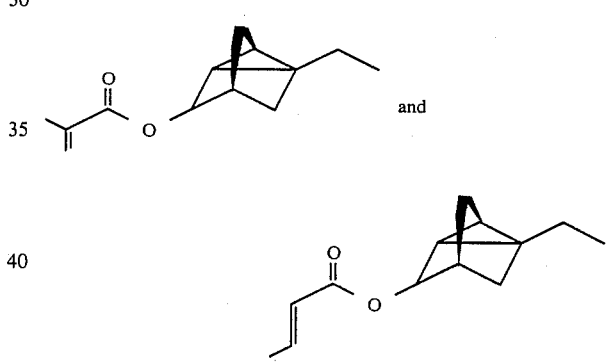

Peaks "130" and "132" are for compounds which are in a minor proportion (20% or less) for example, the compounds having the structures:

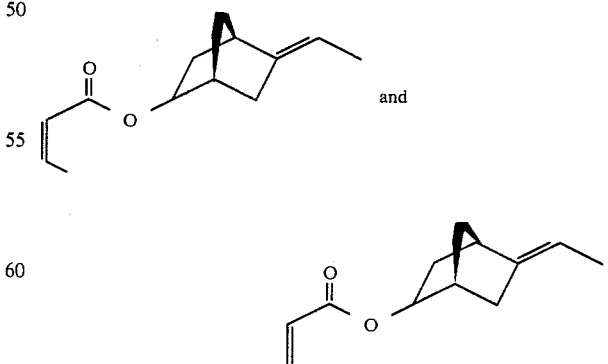

All of the compounds defined according to peaks "130", "131" and "132" may be shown according to the genus having the structure:

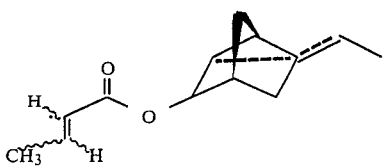

wherein one of the dashed lines represents a carbon-carbon bond and the other of the dashed lines represents no bond and wherein the wavy lines represent hydrogen and methyl groups juxtaposed around the carbon-carbon bond in a "cis" or "trans" configuration.

FIG. 10 is the GLC profile for the reaction product of Example IV containing a major proportion (greater than 80%) of the compound defined according to the structure:

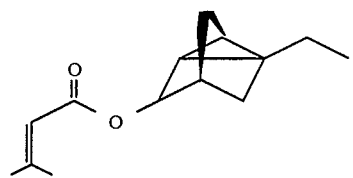

The peak indicated by reference numeral "141" is the peak for this compound having the structure:

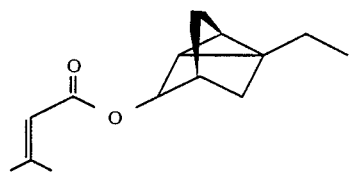

The peaks indicated by reference numerals "140" and "142" are for compounds which are in a minor proportion (less than 20%) such as that having the structure:

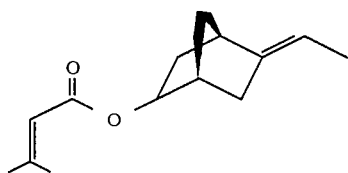

THE INVENTION

It has now been determined that certain substituted norbornyl ester derivatives are capable of imparting a variety of flavors and fragrances to various consumable materials. Briefly, my invention contemplates augmenting or enhancing the flavors and/or fragrances of such consumable materials by adding thereto a small but effective amount of at least one such norbornyl ester derivative defined according to the generic structure:

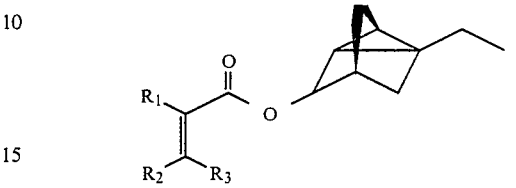

wherein $R_1$, $R_2$ and $R_3$ represent methyl or hydrogen with the proviso that at least one of $R_1$, $R_2$ and $R_3$ is hydrogen; and flavoring (e.g. for foodstuffs, chewing gum, chewing tobaccos, medicinal products and smoking tobaccos) and fragrance compositions (e.g. perfume compositions and compositions for augmenting or enhancing the aromas of perfumed articles such as solid or liquid anionic, cationic, nonionic or zwitterionic detergents or fabric softeners or fabric softener articles or cosmetic powders or hair preparations or perfumed polymers) containing such norbornyl ester derivatives. The invention also contemplates a novel process for producing such substituted norbornyl esters.

The norbornyl ester derivatives produced according to the process of my invention which are used in practicing that part of my invention concerning flavoring and fragrance compositions are actually racemic mixtures rather than individual stereoisomers and mixtures of cis and trans isomers rather than individual cis or trans isomers (as the case may be).

The norbornyl ester derivatives of my invention insofar as their fragrance profiles are concerned have sweet, amber-like, powerful long-lasting green, herbaceous, floral (violet-like), fruity, powerful anisic and bergamot-like aromas.

Insofar as their flavor uses are concerned, (e.g. foodstuffs, chewing gums, medicinal products, toothpastes and chewing tobaccos), the norbornyl ester derivatives of my invention have sweet, licorice-like, anise oil-like, spicy, dill-like, fresh dandelion leaf, raw spinach and scallion-like aroma and taste nuances.

Insofar as smoking tabacco flavors and aromas are concerned, the norbornyl ester derivatives of my invention have Turkish tobacco-like aroma and taste nuances on smoking in both the main stream and the side stream and also prior to smoking.

The following table sets forth the structure and organoleptic property profiles for specific compounds produced according to the examples listed herein and located infra:

TABLE I

| Structure | Fragrance Profile | Food Flavor Profile |
|---|---|---|
| 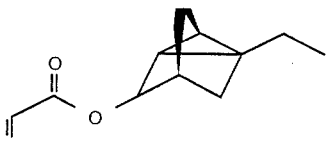<br>(produced according to Example I) | Sweet, anisic, amber-like aroma with green, herbaceous top notes. | A sweet, licorice-like, anise oil-like, spicy (dill-like) aroma and taste profile at 0.1 ppm causing it to be useful for licorice, spearmint and mouthwash flavors. |
| 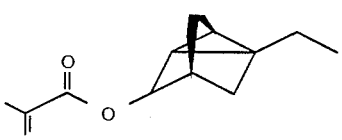<br>(produced according to Example II) | A powerful long-lasting green, herbaceous aroma. | A fresh dandelion leaf, raw spinach aroma and taste with faint scallion-like nuances at 0.01 ppm causing it to be extremely useful in salad dressing flavors. |
| 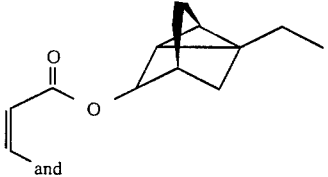<br>and | A floral (violet-like), green, fruity aroma profile. | A fresh dandelion-like, raw spinach-like aroma and taste profile at 0.3 ppm causing it to be extremely useful in salad dressing flavors. |
| 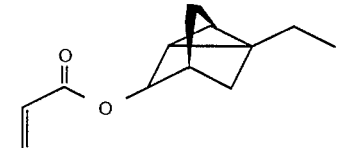<br>(produced according to Example III) | | |
| <br>(produced according to Example IV) | A powerful anisic, bergamot-like, fruity aroma with a citronellal-like undertone. | A sweet, licorice-like aroma and taste profile at 0.001 ppm. |

The compounds of my invention may be prepared by reacting ethylidene norbornene having the structure:

with an acrylic acid derivative defined according to the structure:

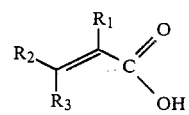

wherein $R_1$, $R_2$ and $R_3$ may be hydrogen or methyl with the proviso that at least one of $R_1$, $R_2$ and $R_3$ is hydrogen in the presence of a catalyst which is either a mineral acid or a Lewis acid. Examples of mineral acid catalysts are sulfuric acid, phosphoric acid, para-toluene sulfonic acid, methane sulfonic acid and acid ion exchange resins. Examples of Lewis acids which can be used as catalysts are boron trifluoride etherate, boron trifluoride, aluminum chloride, zinc chloride, stannic chloride, stannous chloride, zinc bromide, diethyl aluminum chloride, ethyl aluminum dichloride, ethyl aluminum dibromide and diethyl aluminum dibromide. The reaction preferably takes place in the presence of an inert solvent such as tetrahydrofuran, toluene or benzene. The reaction may take place in the absence of the inert solvent and in the presence of an excess of the acrylic acid derivative reactant, the excess of the acrylic acid derivative reactant being used as the "solvent".

The reactant temperature may vary from about 25° C. up to about 120° C. with reflux temperatures being preferred. The reflux temperature depends on the pressure in the reactor and the particular solvent being used as well as its concentration in the reaction mass. The mole ratio of acid catalyst to ethylidene norbornene may vary from about 1:99 up to about 1:10. The mole ratio of ethylidene norbornene reactant to acrylic acid derivative reactant may vary from about 1:1 up to about 1:2 with a mole ratio of about 1:1 of norbornene:acrylic acid derivative reactant being preferred. Thus, the reaction to produce the compounds of my invention may be shown thusly:

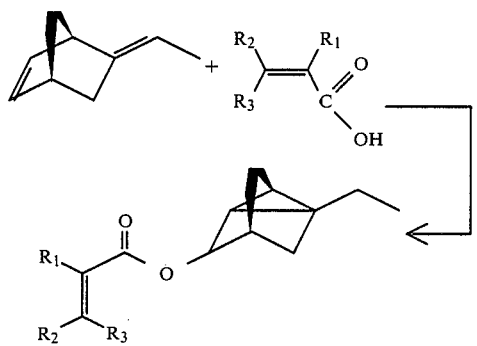

with the compound produced being the compound in greatest proportion (80% or more) in the reaction product mixture. The reaction in more general terms, however, may be shown thusly:

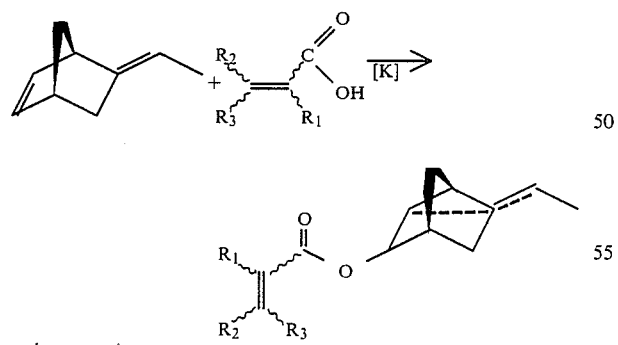

wherein the wavy lines in the acrylic acid reactant structure and in the norbornyl ester derivative are indicative of a "cis" or "trans" juxtaposition of the $R_1$, $R_2$, $R_3$ and carboxylic acid moieties around the carbon-carbon double bond or the $R_1$, $R_2$, $R_3$ and carboalkoxy moieties around the carbon-carbon double bond. The term "[K]" represents the catalyst; that is, the Lewis acid catalyst or the protonic acid catalyst as set forth above. The dashed lines in the reaction product represent carbon-carbon bonds or no bonds. Thus, the reaction product which is shown according to the structure:

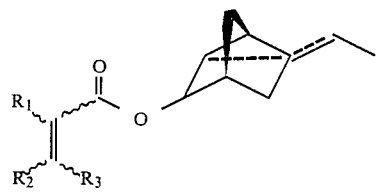

in this more generalized equation represents compounds having the structure:

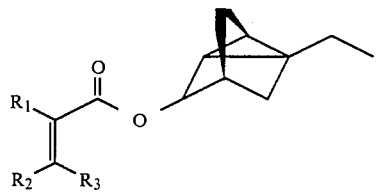

(which is present in greater than 80% concentration) as well as the compounds having the structure:

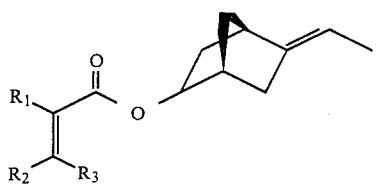

(which are present in less than 20% proportions in the reaction mass) (on a solvent-free basis).

Structures of these isomers are as follows:

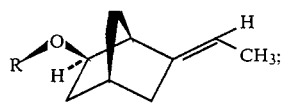

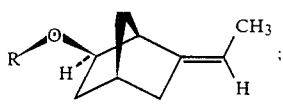

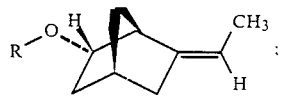

-continued

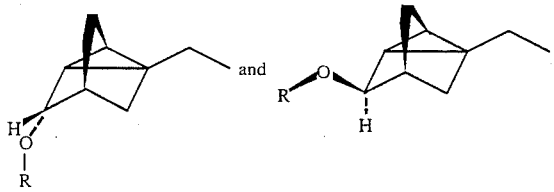

wherein R represents acrylyl, methacrylyl, crotonyl or senecioilyl.

The norbornyl ester derivative(s) and one or more auxiliary perfume ingredients, including, for example, hydrocarbons, alcohols, ketones, aldehydes, nitriles, esters other than said norbornyl ester derivatives, lactones, ethers, hydrocarbons, synthetic essential oils, and natural essential oils may be admixed so that the combined odors of the individual components produce a pleasant and desired fragrance, particularly and preferably in the amber, citrusy, anisic and floral fragrances. Such perfume compositions usually contain (a) the main note or the "bouquet" or foundation stone of the composition; (b) modifiers which round off and accompany the main note; (c) fixatives which include odorous substances which lend a particular note to the perfume throughout all stages of evaporation and substances which retard evaporation and (d) topnotes which are usually low-boiling, fresh-smelling materials.

In perfume compositions, it is the individual components which contribute to their particular olfactory characteristics, however, the overall sensory effect of the perfume composition will be at least the sum total of the effects of each of the ingredients. Thus, one or more of the norbornyl ester derivatives of my invention can be used to alter, modify or enhance the aroma characteristic of a perfume composition, for example, by utilizing or moderating the olfactory reaction contributed by another ingredient in the composition.

The amount of norbornyl ester derivative of my invention which will be effective in perfume compositions as well as in perfumed articles and colognes depends upon many factors including the other ingredients, their amounts and the effects which are desired. It has been found that perfume compositions containing as little as 0.005% of norbornyl ester derivative(s) or even less (e.g. 0.002%) can be used to impart sweet, amber-like, powerful long-lasting green, herbaceous, floral, violet-like, fruity, powerful anisic and bergamot-like aromas with citronellal-like undertones to soaps, cosmetics, detergents (including anionic, cationic, nonionic or zwitterionic solid or liquid detergents) perfumed polymers or other products. The amount employed can range up to 70% of the fragrance components and will depend upon the considerations of cost, nature of the end product, the effect desired on the finished product and the particular fragrance sought.

The norbornyl ester derivative(s) of my invention are useful (taken alone or taken together with other ingredients in perfume compositions) in detergents, soaps, space odorants and deodorants, perfumes, colognes, toilet waters, bath preparations, hair preparations such as lacquers, brilliantines, pomades and shampoos; cosmetic preparations such as creams, deodorants, hand lotions and sun screens; powders such as talcs, dusting powders, face powders and the like.

As little as 0.25% of the the norbornyl ester derivatives will suffice to impart an intense, sweet, amber-like, powerful long-lasting green, herbaceous, floral, fruity, powerful anisic, bergamot-like aroma to citrusy, floral, amber and anisic perfume formulations. Generally no more than 5% of the norbornyl ester derivative(s) based on the ultimate end product is required to be used in the perfume composition.

Furthermore, as little as 0.25% of the norbornyl ester derivatives will suffice to impart such aroma to perfumed articles per se, whether in the presence of other perfume materials or whether used by themselves. Thus, the range of use of the norbornyl ester derivative(s) of my invention in perfumed articles, e.g. perfumed polymers and solid or liquid anionic, cationic, nonionic or zwitterionic detergents, may vary from 0.25% up to about 5% by weight based on the total weight of the perfumed article.

In addition, the perfume composition or fragrance composition of my invention can contain a vehicle or carrier for the norbornyl ester derivative(s). The vehicle can be a liquid such as a non-toxic alcohol, e.g. ethanol, a non-toxic glycol, e.g. propylene glycol, or the like. The carrier can also be an absorbent solid such as a gum (e.g. gum arabic or xanthan gum or guar gum) or components for encapsulating the composition by means of coacervation (such as by gelatin) or by means of formation of a polymer around a liquid center (as by using a urea formaldehyde prepolymer to form a polymeric capsule around a perfume composition center).

It will be appreciated from the present disclosure that the norbornyl ester derivatives according to the present invention can be used to alter, vary, fortify, modify, enhance or otherwise improve the flavor of a wide variety of materials which are ingested, consumed or otherwise organoleptically sensed.

The terms "alter" and "modify" in their various forms will be understood herein to mean the supplying or imparting of a flavor character or note to an otherwise bland, relatively tasteless substance, or augmenting an existing flavor characteristic where the natural flavor is deficient in some regard or supplementing the existing flavor impression to modify their organoleptic character.

The term "enhance" is intended herein to mean the intensification (by use of the norbornyl ester derivative of my invention) of a flavor or aroma note or nuance in a tobacco flavor or foodstuff or perfume composition or perfumed article without changing the quality of said note or nuance.

A "flavoring composition" is taken to mean one which contributes a part of the overall flavor impression by supplementing or fortifying a natural or artificial flavor in a material or one which supplies substantially all the flavor and/or aroma character to a consumable article.

The term "foodstuff" as used herein includes both solid and liquid ingestible materials for man or animals which materials usually do, but need not, have nutritional value. Thus, foodstuffs include meats, gravies, soups, convenience foods, malt, alcoholic and other beverages, milk and dairy products, seafoods, including fish, crustaceans, mollusks and the like, candies, vegetables, cereals, soft drinks, snacks, dog and cat food, other veterinary products, and the like. The norbornyl ester derivatives of my invention are also useful tobacco flavorants and flavor enhancers.

The term "tobacco" will be understood herein to mean natural products such as, for example, burley, Turkish tobacco, Maryland tobacco, flue-cured tobacco and the like including tobacco-like or tobacco-based products such as reconstituted or homogenized leaf and the like as well as tobacco substitutes intended to replace natural tobacco such as lettuce and cabbage leaves and the like. The tobaccos and tobacco products in which the norbornylester derivatives of my invention are useful include those designed or used for smoking such as in cigarettes, cigar and pipe tobacco, as well as products such as snuff, chewing tobacco and the like.

When the norbornyl ester derivatives of this invention are used in a flavoring composition, they can be combined with conventional flavoring materials or adjuvants. Such co-ingredients or flavoring adjuvants are well known in the art for such use and have been extensively described in the literature. Requirements of such adjuvant materials are: (1) that they be non-reactive with the norbornyl ester derivatives of my invention; (2) that they be organoleptically compatible with the norbornyl ester derivatives of my invention whereby the flavor of the ultimate consumable material to which the norbornyl ester derivatives are added is not detrimentally affected by the use of the adjuvant; (3) that they be ingestibly acceptable and thus non-toxic or otherwise non-deleterious. Apart from these requirements, conventional materials can be used and broadly include other flavor materials, vehicles, stabilizers, thickeners, surface active agents, conditioners, and flavor intensifiers.

Such conventional flavoring materials include saturated fatty acids, unsaturated fatty acids and amino acids; alcohols including primary and secondary alcohols, esters, carbonyl compound including ketons and aldehydes; lactones; other cyclic organic materials including benzene derivatives, allicyclic compounds, heterocyclics such as furans, pyridines, pyrazines and the like; sulfur-containing compounds including thiols, sulfides, disulfides and the like; proteins; lipids, carbohydrates; so-called flavor potentiators such as monosodium glutamate, magnesium glutamate, calcium glutamate, guanylates and inosinates; natural flavoring materials such as cocoa, vanilla and caramel; essential oils and extracts such as anise oil, clove oil and the like and artificial flavoring materials such as vanillin and the like.

Specific preferred flavor adjuvants are as follows:
anise oil;
ethyl-2-methyl butyrate;
vanillin;
cis-3-heptenol;
cis-3-hexenol;
trans-2-heptenol;
cis-3-heptenal;
butyl valerate;
2,3-diethyl pyrazine;
methyl cyclopentenolone;
benzaldehyde;
valerian oil;
3,4-dimethoxyphenol;
amyl acetate;
amyl cinnamate;
gamma butyryl lactone;
furfural;
benzaldehyde;
trimethyl pyrazine;
phenyl acetic acid;
isovaleraldehyde;
ethyl maltol;
ethyl vanillin;
ethyl valerate;
ethyl butyrate;
cocoa extract;
coffee extract;
peppermint oil;
spearmint oil;
clove oil;
anethol;
cardamom oil;
wintergreen oil;
cinnamic aldehyde;
2,3-diethyl pyrazine;
ethyl-2-methyl valerate;
gamma hexenyl lactone;
2,4-decadienal;
2,4-heptadienal;
butylidene phthalide.

According to another aspect of my invention, an organoleptically improved smoking tobacco product and additives therefor as well as methods of making the same which overcome specific problems heretofore encountered in which specific Turkish, oriental-like aromas prior to smoking and improved Turkish, oriental aromas on smoking in the main stream and the side stream are created or enhanced or modified or augmented and may be readily controlled and maintained at the desired uniform level regardless of variations in the tobacco components of the blend. In particular, low grade Virginia-type tobaccos may be upgraded using the norbornyl ester derivatives of my invention.

This invention further provides improved tobacco additives and methods whereby various desirable natural aromatic Turkish tobacco flavoring characteristics with oriental notes may be imparted to smoking tobacco products and may be readily varied and controlled to produce the desired uniform flavoring characteristics.

In carrying out this aspect of my invention, I add to smoking tobacco materials or a suitable substitute therefor (e.g. dried lettuce leaves) an aroma and flavor additive containing as an active ingredient one or more of the norbornyl esters of my invention.

In addition to the norbornyl esters of my invention, other flavoring and aroma additives may be added to the smoking tobacco material or substitute therefor either separately or in admixture with the norbornyl ester derivatives of my invention as follows:
I. Synthetic materials:
Beta-ethyl-cinnamaldehyde;
Eugenol;
Dipentene;
Beta-damascenone;
Maltol;
Ethyl maltol;
Delta undecalactone;
Delta decalactone;
Benzaldehyde;
Amyl acetate;
Ethyl butyrate;
Ethyl valerate;
Ethyl acetate;
2-hexenol-1;
2-methyl-5-isopropyl-1,3-nonadiene-8-one;
2,6-dimethyl-2,6-undecadiene-10-one;
2-methyl-5-isopropyl acetophenone;
2-hydroxy-2,5,5,8a-tetramethyl-1-(2-hydroxyethyl)-decahydronaphthalene;
Dodecahydro-3a,6,6,9a-tetramethyl naphtho(2,1-b)-furan;

4-hydroxy hexanoic acid, gamma lactone; and
Polyisoprenoid hydrocarbons defined in Example V of U.S. Pat. No. 3,589,372 issued on June 29, 1971.

II. Natural oils:
Celery seed oil;
Coffee extract;
Bergamot oil;
Cocoa extract;
Nutmeg oil; and
Origanum oil.

An aroma and flavoring concentrate containing one or more of the norbornyl ester derivatives of my invention and, if desired, one or more of the above indicated additional flavoring additives may be added to the smoking tobacco material, to the filter or to the leaf or paper wrapper. The smoking tobacco material may be shredded, cured, cased and blended tobacco material or reconstituted tobacco material or tobacco substitutes (e.g. lettuce leaves) or mixtures thereof. The proportions of flavoring additives may be varied in accordance with taste but insofar as enhancement or the imparting of oriental and/or Turkish tobacco notes, I have found that satisfactory results are obtained if the proportion by weight of the sum total of norbornyl esters to smoking tobacco material is between 50 ppm and 1,500 ppm (0.005%-0.15%) of the active ingredients to the smoking tobacco material. I have further found that satisfactory results are obtained if the proportion by weight of the sum total of norbornyl ester derivatives used to flavoring material is between 500 and 15,000 ppm (0.05%-1.5%).

Any convenient method for incorporating the norbornyl esters into the tobacco product may be employed. Thus, the norbornyl ester derivatives taken alone or along with other flavoring additives may be dissolved in a suitable solvent such as ethanol diethylether and/or volatile organic solvents and the resulting solution may either be spread onto the cured, cased, and blended tobacco material or the tobacco material may be dipped into such solution. Under certain circumstances, a solution of the norbornyl esters taken alone or taken further together with other flavoring additives as set forth above may be applied by means of a suitable applicator such as a brush or roller on the paper or leaf wrapper for the smoking product, or it may be applied to the filter by either spraying or dipping or coating.

Furthermore, it will be apparent that only a portion of the tobacco or substitute therefor need be treated and the thus-treated tobacco may be blended with other tobaccos before the ultimate tobacco product is formed. In such cases, the tobacco treated may have the norbornyl ester derivatives in excess of the amounts or concentrations above indicated so that when blended with other tobaccos, the final product will have the percentage within the indicated range.

In accordance with one specific example of my invention, an aged, cured and shredded domestic Virginia tobacco is spread with a 20% alcohol solution of the compound having the structure:

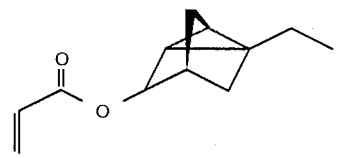

produced according to Example I, infra, in an amount to provide a tobacco composition containing 100 ppm by weight of the compound having the structure:

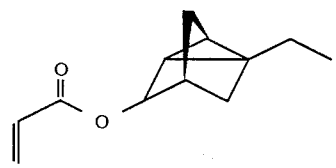

on a dry basis. Thereafter the alcohol is removed by evaporation and the tobacco is manufactured into cigarettes by the usual techniques. The cigarette, when treated as indicated, has a desired and pleasing aroma which is detectable in the main stream and the side stream when the cigarette is smoked. This aroma is described as being sweeter, with pronounced Turkish-/oriental characteristics and with improved body and enhanced tobacco character in the main stream and side stream. In addition, interesting amber nuances are imparted.

While my invention is particularly useful in the manufacture of smoking tobacco such as cigarette tobacco, cigar tobacco and pipe tobacco, other tobacco products fromed from sheeted tobacco dust or fines may also be used. Likewise the norbornyl esters of my invention can be incorporated with materials such as filter tip materials, seam paste, packaging materials and the like which are used along with tobacco to form a product adapted for smoking. Furthermore, the norbornyl esters can be added to certain tobacco substitutes of natural or synthetic origin (e.g. dried lettuce leaves) and, accordingly, by the term "tobacco" as used throughout this specification, is meant any composition intended for human consumption by smoking or otherwise when composed of tobacco plant parts or substitute materials or both.

The following examples are given to illustrate embodiments of the invention as it is presently preferred to practice it. It will be understood that these examples are illustrative and the invention is not to be considered restricted thereto except as indicated in the appended claims.

EXAMPLE I

Preparation of acrylic acid ester of 5-ethyl-tricyclo[2.2.1.0(2,6)]heptan-1-ol

Reaction:

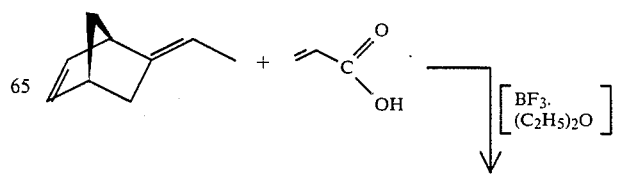

-continued

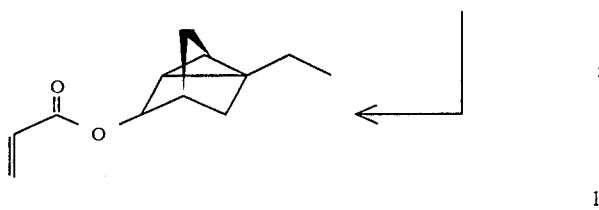

Into a 2 liter reaction flask equipped with stirrer, thermometer, heating mantle and reflux condenser is placed 30 ml borontrifluoride and diethyletherate and 300 ml anhydrous toluene. While maintaining the reaction mass at 25°–34° C., a mixture of 288 grams (4 moles) of acrylic acid and 480 grams (4 moles) of ethylidene norbornene are added to the reaction mass over a 35 minute period. The temperature over the 35 minute period is maintained at 25°–34° C. The reaction mass is then stirred at 25°–34° C. for a period of 20 minutes.

The reaction mass is then washed as follows:
i. 500 ml 10% aqueous sodium chloride
ii. two volumes of 10% sodium chloride
iii. 10% aqueous sodium chloride
iv. 500 ml 5% sodium hydroxide
v. 500 ml 10% aqueous sodium chloride
vi. 500 ml 10% aqueous sodium chloride.

The reaction mass is then dried over anhydrous magnesium sulfate and distilled on a 12"×1.5" Goodloe column yielding the following fractions:

| Fraction Number | Vapor Temp. (°C.) | Liquid Temp. (°C.) | Pressure mm/Hg. | Reflux Ratio |
|---|---|---|---|---|
| 1 | 41/44 | 72/117 | 50 | 2:1 |
| 2 | 96 | 110 | 3 | 2:1 |
| 3 | 82 | 97 | 3 | 2:1 |
| 4 | 82 | 100 | 3 | 1:1 |
| 5 | 83 | 100 | 3 | 100% takeoff |
| 6 | 83 | 104 | 3 | 100% takeoff |
| 7 | 82 | 130 | 3 | 100% takeoff |

FIG. 1 is the GLC profile for the crude reaction product prior to distillation (conditions: 10'×0.125" SE-30 column programmed at 150°–220° C. at 6° C. per minute).

FIG. 2 is the NMR spectrum for fraction 5 of the foregoing distillation containing the compound having the structure:

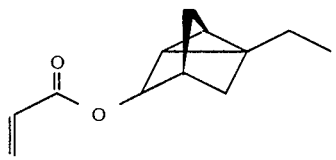

(Solvent: CFCl₃; Field strength: 100 MHz).

FIG. 3 is the infra-red spectrum for fraction 5 of the foregoing distillation containing the compound having the structure:

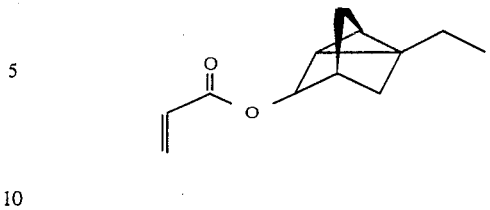

EXAMPLE II

Preparation of methacrylic acid ester of 5-ethyl-tricyclo[2.2.1.0(2,6)]heptan-2-ol Reaction:

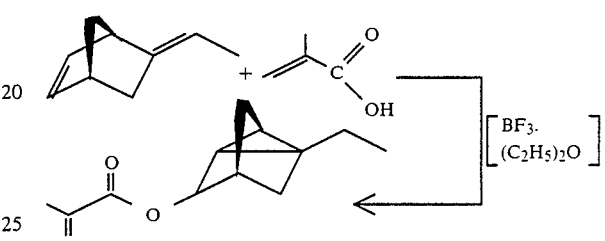

Into a 1 liter reaction flask equipped with stirrer, thermometer, reflux condenser and heating mantle is placed a mixture of 30 ml borontrifluoride diethyletherate and 285 grams of methacrylic acid. While maintaining the reaction mass at 20° C. over a period of 30 minutes, 340 grams of ethylidene norbornene is added with stirring. The reaction mass is then maintained at 15°–20° C. with stirring for a period of 1 hour. At the end of the 1 hour period, the reaction mass is quenched with 500 ml water. The organic layer is separated from the aqueous layer and the organic layer is washed as follows:
i. 10% aqueous sodium chloride
ii. 10% aqueous sodium hydroxide
iii. 3 volumes of 10% sodium chloride The reaction mass is then dried over anhydrous magnesium sulfate and distilled on a 12"×1.5" Goodloe column to yield the following fractions:

| Fraction Number | Vapor Temp. (°C.) | Liquid Temp. (°C.) | Pressure mm/Hg. | Reflux Ratio |
|---|---|---|---|---|
| 1 | 25/85 | 89/100 | 2.0 | 5:1 |
| 2 | 86 | 101 | 2.4 | 1:1 |
| 3 | 84 | 102 | 2.4 | 1:1 |
| 4 | 87 | 103 | 2.4 | 1:1 |
| 5 | 87 | 107 | 2.4 | 1:1 |
| 6 | 88 | 107 | 2.4 | 1:1 |
| 7 | 86 | 105 | 2.4 | 1:1 |
| 8 | 86 | 108 | 2.4 | 1:1 |
| 9 | 86 | 110 | 2.4 | 1:1 |
| 10 | 86 | 120 | 2.4 | 1:1 |
| 11 | 86 | 130 | 2.4 | 1:1 |
| 12 | 92 | 145 | 2.4 | 1:1 |
| 13 | 92 | 180 | 2.4 | 1:1 |

FIG. 4 is the GLC profile for the crude reaction product prior to distillation containing the compound having the structure:

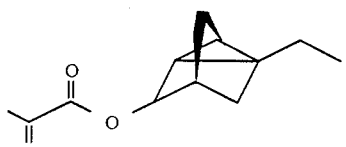

(conditions: SE-30 column programmed at 180° C. isothermal).

FIG. 5 is the NMR spectrum for fraction 3 of the foregoing distillation containing the compound having the structure:

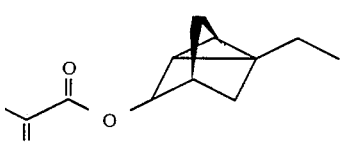

(Solvent: CFCl$_3$; Field strength: 100 MHz).

FIG. 6 is the infra-red spectrum for fraction 3 of the foregoing distillation containing the compound having the structure:

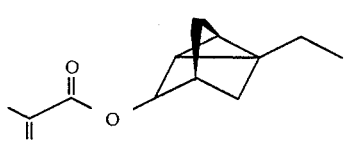

EXAMPLE III

Preparation of crotonic acid ester of 5-ethyl-tricyclo[2.2.1.0(2,6)]heptan-1-ol

Reaction:

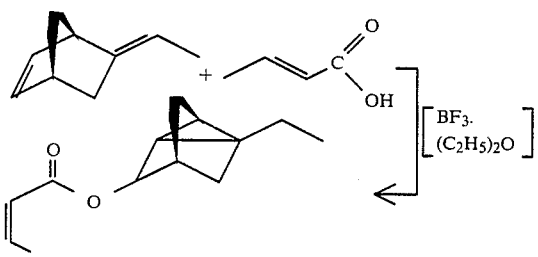

Into a 3 liter reaction flask equipped with thermometer, stirrer, reflux condenser and heating mantle is placed a mixture of 300 grams of anhydrous toluene and 30 ml borontrifluoride etherate. While maintaining the reaction mass at 25° C., 344 grams of crotonic acid is slowly added. While maintaining the reaction mass at 25° C. and over a period of 1 hour, 480 grams of ethylidene norbornene is added to the reaction mass with stirring.

The reaction mass is then stirred for a period of 0.5 hours. At the end of the 0.5 hour period, 500 ml water is added to the reaction mass.

The organic layer is separated from the aqueous layer and the organic layer is washed as follows:
i. 500 ml 10% sodium carbonate
ii. water The reaction mass is then distilled on a 12"×1.5" Goodloe column to yield the following fractions:

| Fraction Number | Vapor Temp. (°C.) | Liquid Temp. (°C.) | Pressure mm/Hg | Reflux Ratio |
|---|---|---|---|---|
| 1 | 28/45 | 82/122 | 3 | 2:1 |
| 2 | 102 | 130 | 3 | 2:1 |
| 3 | 95 | 125 | 3 | 2:1 |
| 4 | 94 | 128 | 3 | 2:1 |
| 5 | 92 | 116 | 3 | 2:1 |
| 6 | 94 | 130 | 3 | 100% take off |
| 7 | 95 | 132 | 3 | 100% take off |
| 8 | 96 | 140 | 3 | 100% take off |
| 9 | 96 | 148 | 3 | 100% take off |
| 10 | 96 | 148 | 3 | 100% take off |
| 11 | 96 | 161 | 3 | 100% take off |
| 12 | 98 | 201 | 3 | 100% take off |

FIG. 7 is the GLC profile for the crude reaction product prior to distillation, containing the compounds having the structures:

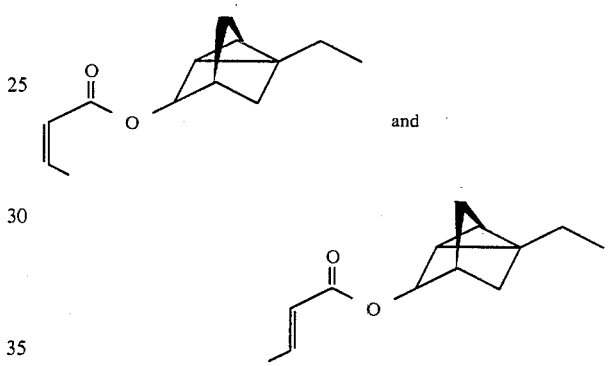

FIG. 8 is the NMR spectrum for fraction 10 of the foregoing distillation containing the compounds having the structures:

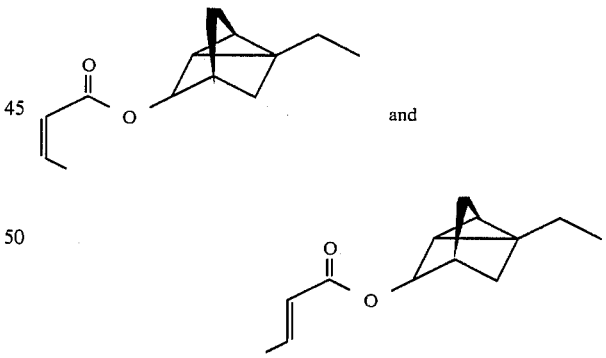

Solvent: CFCl$_3$; Field strength: 100 MHz).

FIG. 9 is the infra-red spectrum for fraction 10 of the foregoing distillation containing the compounds having the structures:

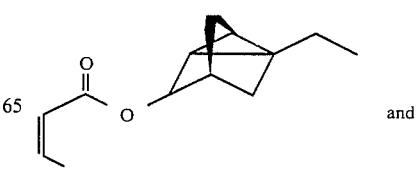

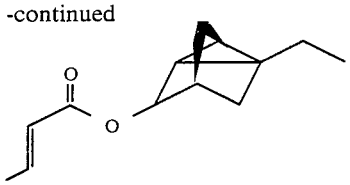

EXAMPLE IV

Preparation of 3-methyl crotonic acid ester of 5-ethyl-tricyclo[2.2.1.0(2,6)]heptan-1-ol Reaction:

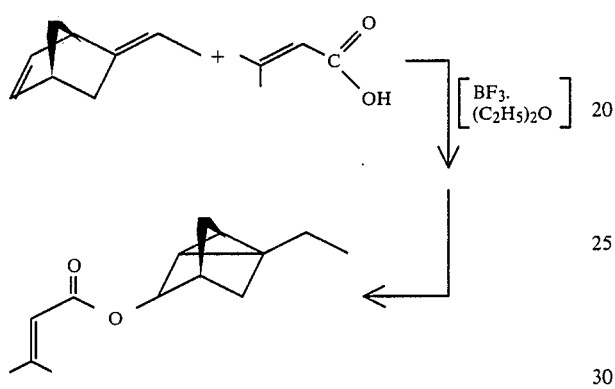

Into a 3 liter reaction flask equipped with stirrer, thermometer, reflux condenser and heating mantle is placed a mixture of 400 grams of senecioic acid (4 moles), 300 grams anhydrous toluene and 30 ml borontrifluoride diethyletherate. Over a 1 hour period, while maintaining the reaction mass at 25°–30° C. 480 grams (4 moles) of ethylidene norbornene is added to the reaction mass. The reaction mass is then stirred for 0.5 hours.

The reaction mass is then quenched with 1 liter of saturated sodium chloride solution. The aqueous phase is separated from the organic phase and the organic phase is then washed as follows:

i. One liter of 10% aqueous sodium carbonate
ii. One liter of sodium chloride
iii. 300 ml water
iv. One liter 10% sodium chloride.

The reaction mass is then dried ovr anhydrous magnesium sulfate and distilled on a 12"×1.5" Goodloe column yielding the following fractions:

| Fraction Number | Vapor Temp. (°C.) | Liquid Temp. (°C.) | Pressure mm/Hg. | Reflux Ratio |
|---|---|---|---|---|
| 1 | 76/30 | 80/100 | 15/3 | 100% take off |
| 2 | 110 | 126 | 3 | 2:1 |
| 3 | 104 | 122 | 3 | 2:1 |
| 4 | 104 | 125 | 3 | 100% take off |
| 5 | 110 | 127 | 3 | 100% take off |
| 6 | 112 | 129 | 3 | 100% take off |
| 7 | 112 | 129 | 3 | 100% take off |
| 8 | 118 | 132 | 3 | 100% take off |
| 9 | 118 | 135 | 3 | 100% take off |
| 10 | 120 | 138 | 3 | 100% take off |
| 11 | 122 | 138 | 3 | 100% take off |
| 12 | 125 | 145 | 3 | 100% take off |
| 13 | 125 | 148 | 3 | 100% take off |
| 14 | 125 | 158 | 3 | 100% take off |

FIG. 10 is the GLC profile for the crude reaction product of Example IV prior to distillation containing the compound having the structure:

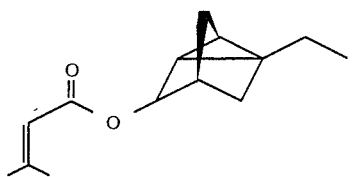

(conditions: SE-30 column programmed at 150°–220° C. at 8° C. per minute).

FIG. 11 is the NMR spectrum for fraction 9 of the foregoing distillation containing the compound having the structure:

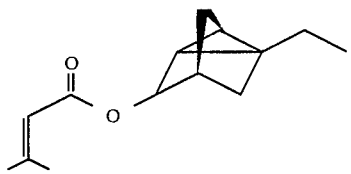

(Solvent: CFCl$_3$; Field strength: 100 MHz).

FIG. 12 is the infra-red spectrum for fraction 9 of the foregoing distillation containing the compound having the structure:

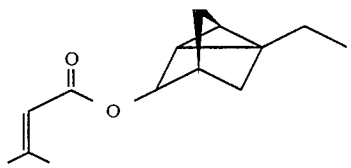

EXAMPLE V

Pine needle perfume formulation

The following formulation is prepared:

| Ingredients | Parts by Weight |
|---|---|
| Turpentine gum oil | 100 |
| Limonene | 70 |
| Gum camphor | 10 |
| Isobornyl acetate | 50 |
| Borneol | 30 |
| 2-(2-butenoyl)-3,3-dimethylnorbornane (produced according to Example XII of U.S. Pat. No. 4,148,826) | 40 |
| Mixture of 2-(3-butenoyl)3,3-dimethyl-norbornane and 2-(2-butenoyl)-3,3-dimethylnorbornane (produced according to the process of Example III of U.S. Pat. No. 4,148,826) | 100 |
| Alpha-allyl-3,3-dimethyl-2-norbornane-methanol (produced according to the process of Example II of U.S. Pat. No. 4,148,826) | 70 |

| Ingredients | Parts by Weight |
|---|---|
| Compound produced according to Example II having the structure: 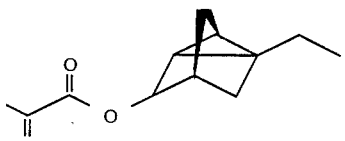 | 30 |

The compound produced according to Example II having the structure:

[structure]

adds to this pine needle oil an excellent, powerful, long-lasting, green, herbaceous aroma which makes it more natural-like.

EXAMPLE VI

Bergamot perfume

The following formulation is prepared:

| Ingredients | Parts by Weight |
|---|---|
| Bergamot oil stripped of bergaptans | 30 |
| Limonene | 70 |
| Citronellal coeur | 20 |
| Citral | 14 |
| Compound produced according to Example IV having the structure: 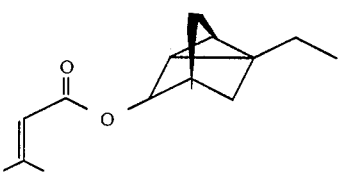 | 82 |

The compound produced according to Example IV having the structure:

[structure]

adds to this bergamot formulation a powerful anisic natural bergamot note reminiscent of freshly-harvested bergamot fruit.

EXAMPLE VII

Patchouli perfume formulation

The following mixture is prepared:

| Ingredients | Parts by Weight |
|---|---|
| Orange oil | 50 |
| Bergamot oil | 20 |
| Lime oil | 100 |
| Neroli oil | 5 |
| 4-(4-methyl-4-hydroxyamyl)delta$^3$-cyclohexene carboxaldehyde | 5 |
| 2,3,3A,4,5,7A-hexahydro-6,7A,8,8-tetramethyl-1,5-methano-1H—inden-1-ol (prepared according to the process of Example I of U.S. Pat. No. 3,989,760 issued on November 2, 1976) | 100 |
| 1',2',3',4',5',6',7',8'-octahydro 2',3',8',8'-tetramethyl-2'-acetonaphthone isomer mixture produced according to the process of Example VII of Application for U.S. Letters Patent Serial No. 434,948 filed on January 21, 1974, how U.S. Pat. No. 3,911,018 issued on October 7, 1975 | 50 |
| Gamma methyl ionone | 20 |
| 1-acetyl-2,5,5-trimethylcycloheptane produced according to U.S. Pat. No. 3,869,411 issued on March 4, 1975 | 50 |
| Compound produced according to Example I having the structure: | 100 |
| Compounds produced according to Example III having the structures: | 150 |

The compounds of Examples I and III having the structures:

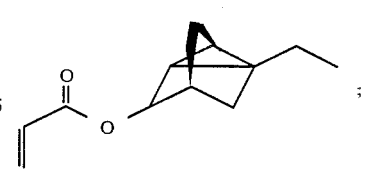

-continued

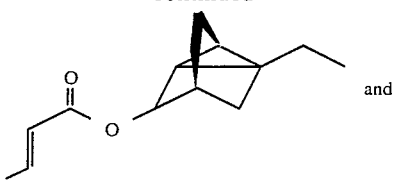
and
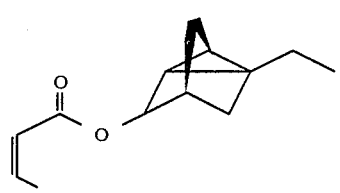

add to this patchouli formulation an interesting, sophisticated, sweet, amber-like, violet flower-like and fruity aroma profile with green and herbaceous topnotes.

EXAMPLE VIII

Rose formulation

To demonstrate the use of the compounds having the structures:

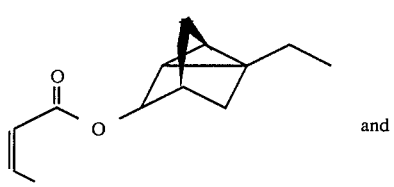
and
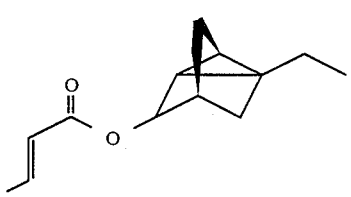

produced according to Example III is a rose formulation, the following formula is prepared:

| Ingredients | Parts by Weight |
|---|---|
| Phenylethyl alcohol | 200 |
| Geraniol | 400 |
| Trichloromethylphenyl carbinyl acetate | 20 |
| Phenylethyl acetate | 60 |
| Undecylenic aldehyde (10% in diethyl phthalate) | 5 |
| n-nonyl aldehyde (10% in diethyl phthalate) | 2 |
| Musk ketone | 10 |
| Musk ambrette | 10 |
| Eugenol phenyl acetate | 20 |
| Citronellol | 100 |
| Vanillin (10% in diethyl phthalate) | 30 |
| Eugenol | 30 |
| Citronellyl formate | 30 |
| Geranyl acetate | 10 |
| Linalool | 40 |
| Geranyl phenyl acetate | 50 |
| Cis beta, gamma-hexenyl acetate | 2 |

-continued

| Ingredients | Parts by Weight |
|---|---|
| Mixture of compounds prepared according to Example III having the structures: 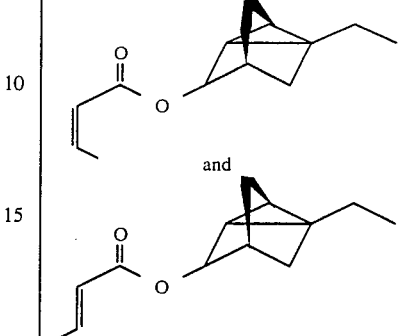 | 5 |

The addition of 0.5% of the mixture of compounds having the structures:

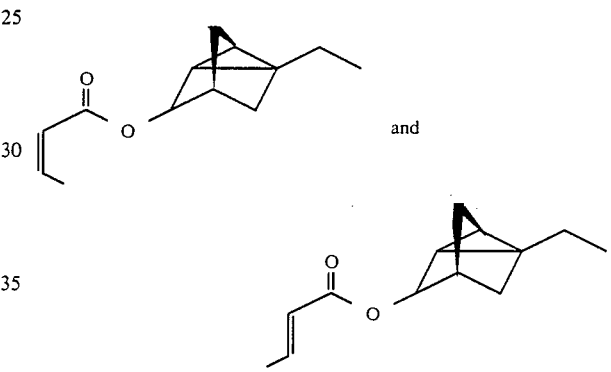

prepared according to Example III lends a great deal of strength and character to the rose fragrance. It contributes the great floralcy and heady natural sweetness of the red rose flower together with green and fruity nuances and sweet, floral topnotes.

At lower concentrations (0.01%), this mixture of compounds' contribution is more subtle, however, it still gives an interesting natural effect with the violet flower-like undertone.

The product may normally be used from approximately 0.01% to 10% in perfume compositions. For special effects, however, higher concentrations (50% plus) can be used.

EXAMPLE IX

Preparation of soap compositions

One hundred grams of soap chips are produced according to Example V of U.S. Pat. No. 4,058,487 issued on Nov. 15, 1977, the specification for which is incorporated herein by reference, as follows:

The sodium salt of an equal mixture of $C_{10}$–$C_{14}$ alkane sulfonate (95% active), 40 pounds, is dissolved in a mixture of 80 pounds of anhydrous isopropanol and 125 pounds of deionized water at 150° F. In this mixture is dissolved 10 pounds of partially hydrogenated coconut oil fatty acids and 15 pounds of sodium mono-$C_{14}$ alkyl maleate, and the pH of this solution is adjusted to 6.0 by the addition of a small amount of 50% aqueous solution of sodium hydroxide. The isopropanol is distilled off and the remaining aqueous solution is drum dried. The resulting solid actives are then blended in a chip mixture with 10 pounds of water, 0.2 pounds of titanium hydroxide and 0.7 pounds of one of the perfume ingredients set forth in Table II below. The chips are then plodded into logs, cut to size and finally stamped into bars having a pH of approximately 6.9.

Each of the perfumed soaps produced by means of the foregoing procedure manifests an excellent aroma as set forth in Table II infra.

TABLE II

| Ingredient | Fragrance Profile |
|---|---|
| Perfume composition of Example V | A pine needle aroma with powerful long-lasting green, herbaceous nuances. |
| Perfume composition of Example VI | A natural, fresh, bergamot oil aroma with powerful anisic nuances. |
| Perfume composition of Example VII | A patchouli aroma with sweet, anisic, amber-like, violet flower-like, green and fruity undertones. |
| Perfume composition of Example VIII | A rose aroma with a floral, green, fruity topnote profile and a violet-like undertone. |
| Compound produced according to Example I having the structure: | A sweet, anisic, amber-like aroma with green, herbaceous topnotes. |
| Compound produced according to Example II having the structure: | A powerful, long-lasting, green, herbaceous aroma. |
| Compounds produced according to Example III having the structures: and | A floral (violet-like), green, fruity aroma. |

TABLE II-continued

| Ingredient | Fragrance Profile |
|---|---|
| Compound produced according to Example IV having the structure: | A powerful, anisic, bergamot-like, fruity aroma with citronnelal like undertones. |

EXAMPLE X

Preparation of a detergent composition

A total of 100 grams of a detergent powder prepared according to U.S. Pat. No. 4,058,472 (the specification for which is incorporated by reference herein) and containing 5% by weight of the sodium salts of a mixture of sulfonated $C_{14}$-$C_{18}$ alkyl catechol as a surface active component, the mixture being 60 parts by weight of mono-$C_{14}$-$C_{18}$ alkyl catechol and 40 parts by weight of di-$C_{14}$-$C_{18}$ alkyl catechol, 35% sodium tetrapyrophosphate, 30% sodium silicate, 20% of sodium carbonate, 3% of sodium carboxymethyl cellulose and 7% of starch is mixed with 0.15 grams individually with each of the aroma ingredients set forth in Table II of Example IX until a substantially homogeneous composition is obtained. Each of the compositions has an excellent aroma as set forth in Table II of Example IX.

EXAMPLE XI

Preparation of a cosmetic powder composition

A cosmetic powder is prepared by mixing in a ball mill, 100 grams of talcum powder with 0.25 grams of each of the perfume materials of Table II of Example IX. Each of the powders has an excellent aroma as set forth in Table II of Example IX.

EXAMPLE XII

Perfumed liquid detergent

Concentrated liquid detergents with aromas as set forth in Table II of Example IX are prepared by adding 0.10%, 0.15% and 0.20% of each of the ingredients set forth in Table II of Example IX. They are prepared by adding and homogeneously mixing the appropriate quantity of perfume substance of Table II of Example IX in the liquid detergent. The detergents individually possess aromas as set forth in Table II of Example IX, the intensity increasing with greater concentrations of perfume substance set forth in Table II of Example IX.

EXAMPLE XIII

Preparation of a cologne and handkerchief perfume

Each of the ingredients of Table II of Example IX is incorporated individually into colognes of several strengths at concentrations of 2.0%, 2.5%, 3.0%, 3.5%, 4.0% and 5.0% in 75%, 80%, 85%, 90% and 95% aqueous ethanol; and into several concentrations of handkerchief perfumes at the rates of 15%, 20% and 25% (in 80%, 85%, 90% and 95% aqueous ethanol). Distinct and definite aromas as set forth in Table II of Example IX are imparted to the colognes and to the handkerchief perfumes at the several concentrations set forth above.

EXAMPLE XIV

Preparation of soap compositions

One hundred grams of soap chips (Ivory ® produced by the Proctor & Gamble Company of Cincinnati, Ohio) are admixed with one gram of each of the substances set forth in Table II of Example IX supra until homogeneous compositions are obtained. In each of the cases, the homogeneous compositions are heated under 3 atmospheres pressure at 180° C. for a period of three hours and the resulting liquids are placed into soap molds. The resulting soap cakes, on cooling, manifest excellent aromas as set forth in Table II of Example IX.

EXAMPLE XV

Preparation of solid detergent compositions

Detergents are prepared from the following ingredients according to Example I of Canadian Pat. No. 1,007,948, the specification for which is incorporated by reference herein:

| Ingredients | Parts by Weight |
|---|---|
| Neodol ® 45-11 (a $C_{14}$-$C_{15}$ alcohol ethoxylated with 11 moles of ethylene oxide) | 12 |
| Sodium carbonate | 55 |
| Sodium citrate | 20 |
| Sodium sulfate, water brighteners | q.s. |

This detergent is a "phosphate-free" detergent. A total of 100 grams of said detergent is admixed with 0.10, 0.15, 0.20 and 0.25 grams of each of the substances set forth in Table II of Example IX supra. Each of the detergent samples has an excellent aroma as indicated in Table II of Example IX.

EXAMPLE XVI

Preparation of drier-added fabric softener article

Utilizing the procedure of Example I at column 15 of U.S. Pat. No. 3,632,396 the specification for which is incorporated by reference herein, a non-woven cloth substrate useful as a drier-added fabric softening article of manufacture is prepared wherein the substrate, substrate coating and outer coating and the perfume material are as follows:

1. a water "dissolvable" paper ("Dissolvo Paper") as the substrate;
2. Adogen 448 ® (melting point about 140° F.) as the first substrate coating; and
3. an outer coating having the following formulation (melting point about 150° F.):
   57% $C_{20}$-$C_{22}$ HAPS;
   22% isopropyl alcohol;
   20% antistatic agent;
   1% of one of the perfumery substances set forth in Table II of Example IX supra.

Fabric softening compositions containing the substances as set forth in Table II of Example IX supra essentially consist of a substrate having a weight of about 3 grams per 100 square inches; a substrate coating weighing about 1.85 grams per 100 square inches of substrate; and an outer coating weighing about 1.5 grams per 100 square inches of substrate are prepared thereby providing a total aromatized substrate and outer coating weight ratio of about 1:1 by weight of the substrate.

The aromas as set forth in Table II of Example IX supra are imparted in a pleasant manner to the head space in a drier on operation thereof using the said drier-added fabric softening non-woven fabric by adding to the drying cycle.

As stated above in the case of fabric softener articles, the entire U.S. Pat. No. 3,632,396 is incorporated by reference herein. Thus, all of the articles of U.S. Pat. No. 3,632,396 acting as fabric softening articles in said U.S. patent may be perfumed in their outer coating with from 0.25% up to 5% by weight of each of the perfuming substances of Table II of Example IX supra.

EXAMPLE XVII

Hair preparation

A "soft-feel, good-hold" hair spray is produced containing the following ingredients:

| Ingredients | Parts by Weight |
|---|---|
| Polyvinylpyrrilidones/vinyl acetate "E-735 Copolymer" manufactured by the GAF Corporation of New York, N.Y. | 4.00 |
| Anhydrous ethanol | 70.90 |
| Dioctyl sebecate | 0.05 |
| Benzyl alcohol | 0.05 |
| "Propellant A46" manufactured by the GAF Corporation of New York, N.Y. | 24.95 |
| Fragrance ingredient as set forth in Table II of Example IX supra | 0.05 |

The PVP/VA copolymers are first dissolved in alcohol and all other ingredients are added until uniform. The propellant is then pressurized and used as an aerosol. The resulting hair sprays each have pleasant aromas as set forth in Table II of Example IX.

EXAMPLE XVIII

Scouring cleanser composition

A scouring cleanser composition is prepared in accordance with Example I at columns 11 and 12 of U.S. Pat. No. 4,193,888 issued on Mar. 18, 1980, the specification for which is incorporated by reference herein. To this composition, the substances set forth in Table II of Example IX supra are added at the level of 0.25% as set forth in the table in said Example I of U.S. Pat. No. 4,193,888 yielding an aroma on using said cleanser in ordinary circumstances which is quite pleasant and described in Table II of Example IX supra.

EXAMPLE XIX

A fabric softening article prepared substantially as set forth in Example VIII of Canadian Pat. No. 1,069,260, the specification for which is incorporated by reference herein, is prepared containing 0.21% by weight of a perfuming substance as set forth in Table II of Example IX supra and yielding on use in a drier, a faint aroma as set forth in Table II of Example IX supra.

EXAMPLE XX

Tobacco flavor formulations

Cigarettes are produced using the following tobacco formulations:

| Ingredients | Parts by Weight |
|---|---|
| Bright | 40.1 |
| Burley | 24.9 |
| Maryland | 1.1 |
| Turkish | 11.6 |
| Stem (flue cured) | 14.2 |
| Glycerine | 2.8 |
| H₂O | 5.3 |

At the rate of 0.2%, the following tobacco formulation is applied to all of the cigarettes produced with the above tobacco formulation:

| Ingredients | Part by Weight |
|---|---|
| Ethyl butyrate | 0.05 |
| Ethyl valerate | 0.05 |
| Maltol | 2.00 |
| Cocoa extract | 26.00 |
| Coffee extract | 10.00 |
| Ethyl alcohol (95%) | 20.00 |
| H₂O | 41.90 |

To portions of 50% of the cigarettes at levels of 10 and 20 ppm, the compound of Example IV having the structure:

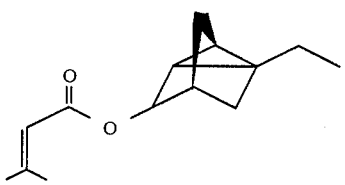

is added. These cigarettes are hereinafter called "experimental" cigarettes. The cigarettes without the compound of Example IV having the structure:

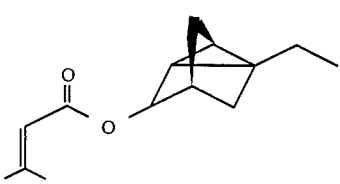

are hereinafter called "control" cigarettes. The control and experimental cigarettes are then evaluated by paired comparison and the results are as follows:
a. In aroma, the experimental cigarettes are all found to be more aromatic with Turkish tobacco-like nuances.
b. In smoke flavor, the experimental cigarettes are all found to be more aromatic, more sweet with Turkish tobacco, oriental-like nuances than the control cigarettes.

The experimental cigarettes containing 20 ppm of the compound having the structure:

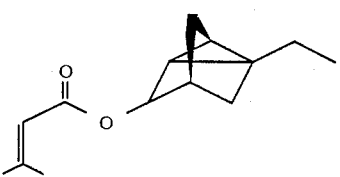

are found to be fruity and have pleasant aesthetically pleasing licorice-like notes in addition.

EXAMPLE XXI

Basic oral hygiene flavor formulation

The following basic oral hygiene flavor formulation is prepared:

| Ingredients | Parts by Weight |
|---|---|
| Peppermint oil | 89.0 |
| Spearmint oil | 2.0 |
| Clove oil | 1.0 |
| Anethol | 2.0 |
| Cardamom oil | 0.1 |
| Wintergreen oil | 5.0 |
| Cinnamic aldehyde | 0.9 |

The basic oral hygiene flavor formulation is now divided into two parts. To the first part at the rate of 10% is added the compound having the structure:

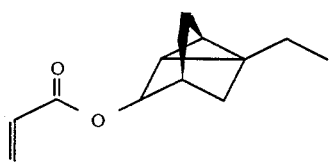

produced according to Example I. To the second part, nothing is added. The flavor with the addition of the material produced according to Example I having the structure:

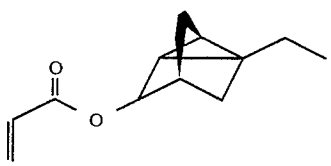

has a fresher, sweet, licorice, anise oil-like, spicy aroma and taste characteristic. The peppermint characteristics also appear to be enhanced. Therefore, the flavor with the material produced according to Example I having the structure:

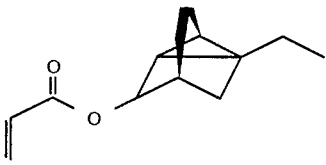

is preferred by a bench panel.

EXAMPLE XXII

Green salad dressing flavor

The following flavor formulation is prepared:

| Ingredients | Parts by Weight |
|---|---|
| Black pepper oil | 4 |
| Nutmeg oil | 3 |
| Celery oil | 3 |
| Lemon oil | 3 |

| Ingredients | Parts by Weight |
| --- | --- |
| Mustard oil | 1 |
| Vinegar-citric acid (50:50 mixture) | 120 |
| Starch paste prepared from tapioca flour-water (50:50 mixture) | 300 |
| Liquid egg yolks | 210 |
| Sodium chloride | 7 |
| Sucrose | 10 |
| Mustard | 20 |
| Locust bean gum | 6 |
| 2-(2'-n-butyl)-4,5-dimethyl thiazoline prepared according to Example III of U.S. Pat. No. 4,243,688 | 2 |

Compound produced according to Example II having the structure:

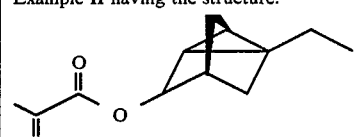

or compounds produced according Example III having the structures:

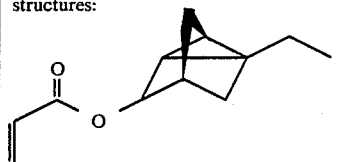

and

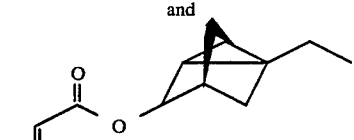

The addition of the compounds produced according to Example II or III to this green salad dressing formulation causes the salad dressing to have a fresh, dandelion leaf, raw spinach nuance. The use of the compound of Example II having the structure:

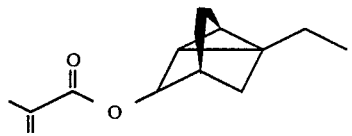

in addition, imparts faint, scallion-like nuances to the salad dressing.

When the resulting salad dressing flavor is incorporated into a salad dressing in the standard way and the salad dressing is used on a green salad, interesting dandelion leaf, raw spinach nuances are imparted to the overall salad even in the absence of dandelion leaf and spinach.

EXAMPLE XXIII

Licorice chewing stick

A flexible licorice stick is prepared in a standard manner. Prior to hardening, at the level of 0.05 ppm, the compound of Example IV having the structure:

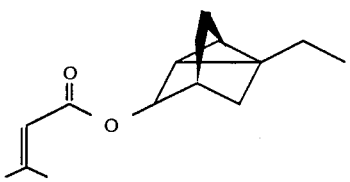

is added to the molten mixture. The molten mixture is molded into licorice sticks and hardened for marketing. Each of the licorice sticks has a pleasant, powerful, natural-like licorice anisic, China Star Anise Oil-like flavor. No China Star Anise Oil was used in producing these licorice sticks.

What is claimed is:

1. A process for augmenting or enhancing the aroma or taste of a foodstuff comprising the step of adding to said foodstuff an aroma or taste augmenting or enhancing quantity of at least one ester defined according to the structure:

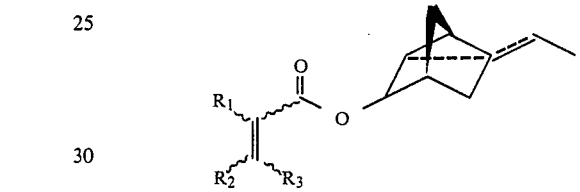

wherein one of the dashed lines represents a carbon-carbon bond and the other of the dashed lines represents no bond; wherein the wavy lines represent a "cis" or a "trans" juxtaposition of the $R_1$, $R_2$, $R_3$ and carboalkoxy moieties around the carbon-carbon double bond; wherein $R_1$, $R_2$ and $R_3$ each represents methyl or hydrogen with the proviso that at least one of $R_1$, $R_2$ and $R_3$ is hydrogen.

2. The process of claim 1 wherein the ester is defined according to the structure:

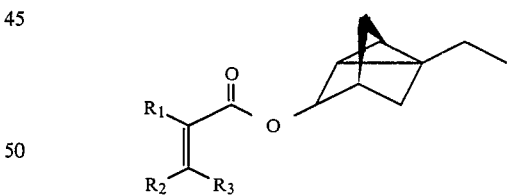

wherein $R_1$, $R_2$ and $R_3$ is methyl or hydrogen and at least one of $R_1$, $R_2$ and $R_3$ is hydrogen.

3. The process of claim 1 wherein the ester has the structure:

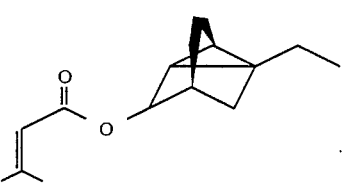

4. The process of claim 1 wherein the ester has the structure:

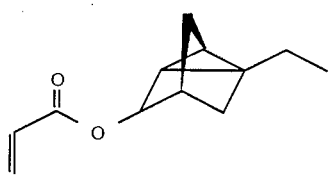

5. The process of claim 1 wherein the ester has the structure:

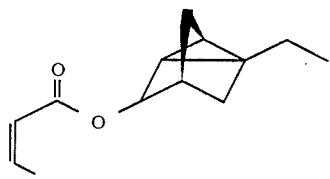

6. The process of claim 1 wherein the ester has the structure:

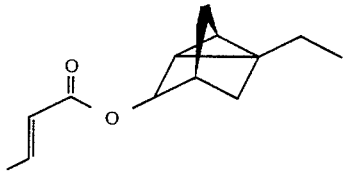

7. The process of claim 1 wherein the ester has the structure:

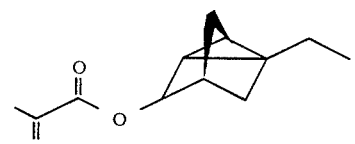

8. A process for augmenting or enhancing the aroma or taste of a foodstuffs comprising the step of adding to said foodstuff an aroma or taste augmenting or enhancing quantity of a mixture of compounds containing a major proportion of compounds defined according to the structure:

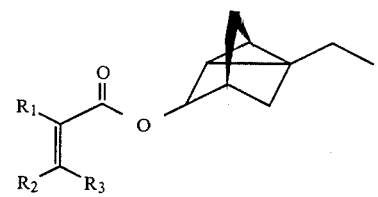

wherein $R_1$, $R_2$ and $R_3$ represents methyl or hydrogen and at least one of $R_1$, $R_2$ and $R_3$ is hydrogen comprising the steps of intimately admixing ethylidene norbornene having the structure:

with an acrylic acid derivative having the structure:

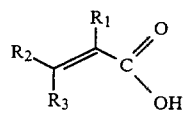

in the presence of a Lewis acid or protonic acid catalyst.

* * * * *